United States Patent
Osindero et al.

(10) Patent No.: US 9,710,433 B2
(45) Date of Patent: Jul. 18, 2017

(54) DYNAMIC CONTENT MAPPING

(71) Applicant: Yahoo! Inc., Sunnyvale, CA (US)

(72) Inventors: Simon Kayode Osindero, San Francisco, CA (US); Robert Jaros, San Francisco, CA (US); Eric Willis, Pacifica, CA (US); Clayton Mellina, San Francisco, CA (US); Anastasia Svetlichnaya, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 556 days.

(21) Appl. No.: 14/093,408

(22) Filed: Nov. 29, 2013

(65) Prior Publication Data

US 2014/0164913 A1    Jun. 12, 2014

Related U.S. Application Data

(60) Provisional application No. 61/731,488, filed on Nov. 30, 2012.

(51) Int. Cl.
*G06F 17/22* (2006.01)
*G06F 17/21* (2006.01)
*G06F 17/30* (2006.01)

(52) U.S. Cl.
CPC ........ *G06F 17/212* (2013.01); *G06F 17/3087* (2013.01); *G06F 17/30905* (2013.01); *G06F 17/30997* (2013.01)

(58) Field of Classification Search
CPC ............... G06F 17/212; G06F 17/3087; G06F 17/30905; G06F 17/30997
See application file for complete search history.

(56) References Cited

U.S. PATENT DOCUMENTS

| | | | | |
|---|---|---|---|---|
| 5,941,944 | A * | 8/1999 | Messerly | G06F 17/30067 707/999.003 |
| 6,236,987 | B1 * | 5/2001 | Horowitz | G06F 17/30696 |
| 7,581,184 | B2 * | 8/2009 | Dubinko | G06F 17/30997 707/999.007 |
| 7,603,367 | B1 * | 10/2009 | Kanter | G06F 17/30 |
| 7,610,185 | B1 * | 10/2009 | Ershov | G06F 17/30973 703/3 |
| 7,698,261 | B1 * | 4/2010 | Khoshnevisan | G06F 17/30864 707/999.003 |
| 7,996,015 | B2 * | 8/2011 | Bloebaum | G06F 17/30265 455/440 |
| 8,683,379 | B2 * | 3/2014 | LuVogt | G06F 17/30867 715/788 |
| 8,775,437 | B2 * | 7/2014 | Weitz | G06F 17/30864 707/748 |

(Continued)

*Primary Examiner* — Maikhanh Nguyen
(74) *Attorney, Agent, or Firm* — Berkeley Law & Technology Group, LLP

(57) ABSTRACT

Briefly, embodiments disclosed herein may relate to dynamic display of representations of digital content for user interaction on computing devices, for example, including displaying a collection of content items on a display of a computing device, wherein a two-or-more-dimensional spatial arrangement of individual content items of the displayed collection comprises individual content items being positioned relative to other individual content items based, at least in part, on analytic characterizations of one or more attributes of the individual content items.

15 Claims, 16 Drawing Sheets

(56) References Cited

U.S. PATENT DOCUMENTS

| | | | |
|---|---|---|---|
| 8,850,362 B1* | 9/2014 | Khoshnevisan | G06F 17/30864 |
| | | | 715/853 |
| 2003/0101176 A1* | 5/2003 | Kelkar | G06F 17/30592 |
| 2006/0026170 A1* | 2/2006 | Kreitler | G06F 17/30241 |
| 2007/0271270 A1* | 11/2007 | Dubinko | G06F 17/30864 |
| 2007/0283290 A1* | 12/2007 | Dubinko | G06F 17/30994 |
| | | | 715/784 |
| 2009/0119278 A1* | 5/2009 | Cross | G06F 17/30864 |
| 2010/0017704 A1* | 1/2010 | Jaffe | G06Q 10/107 |
| | | | 715/243 |
| 2011/0289079 A1* | 11/2011 | LuVogt | G06F 17/30905 |
| | | | 707/727 |
| 2013/0031470 A1* | 1/2013 | Daly, Jr. | G06F 17/30893 |
| | | | 715/243 |
| 2013/0111354 A1* | 5/2013 | Marra | G06Q 50/01 |
| | | | 715/751 |
| 2013/0174074 A1* | 7/2013 | Strzygowski | G06F 3/048 |
| | | | 715/771 |

\* cited by examiner

DYNAMIC CONTENT MAPPING

BACKGROUND

Field

Subject matter disclosed herein may relate to dynamic display of representations of content, such as digital content, such as for user interaction on computing devices, for example.

Information

With networks, such as the Internet, gaining tremendous popularity, and with the vast multitude of content, such as pages and/or other documents and/or other media content and/or applications, becoming available to users, such as via the World Wide Web (web), it may be desirable to provide efficient and/or streamlined approaches to gather, organize and/or display content, such as digital content, that may be desired by and/or useful to a user, for example. Internet-type business entities, such as Yahoo!, for example, may provide a wide range of content, such as information, applications, and/or other digital content, that may be available to users via the Web. In some circumstances, challenges may be faced in determining which content, such as information and/or other content, for example, to display, such as to a user via a web page.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
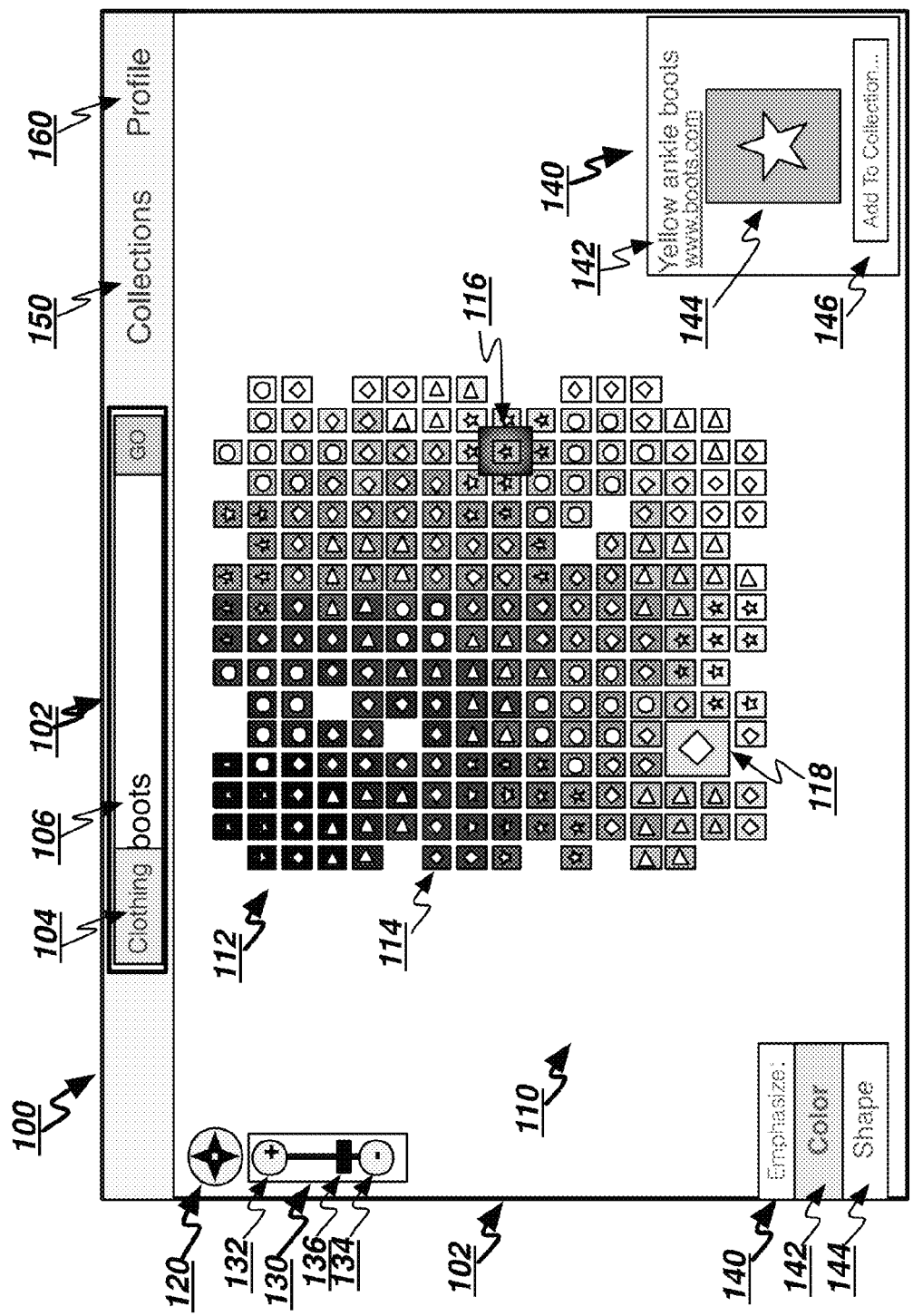
FIG. 1 is an illustration of an example representation of a collection of digital content displayed on a computing device, according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these or similar terms are to be associated with appropriate physical quantities and are intended to merely be convenient labels.

Likewise, in this context, the terms "coupled", "connected," and/or similar terms, may be used. It should be understood that these terms are not intended as synonyms. Rather, "connected" may be used to indicate that two or more elements or other components, for example, are in direct physical and/or electrical contact; while, "coupled" may mean that two or more components are in direct physical or electrical contact; however, "coupled" may also mean that two or more components are not in direct contact, but may nonetheless co-operate or interact. The term coupled may also be understood to mean indirectly connected, for example, in an appropriate context.

The terms, "and", "or", "and/or" and/or similar terms, as used herein, may include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms may be used to describe any feature, structure, and/or characteristic in the singular and/or may be used to describe a plurality or some other combination of features, structures and/or characteristics. Though, it should be noted that this is merely an illustrative example and claimed subject matter is not limited to this example. Again, particular context of description or usage may provide helpful guidance regarding inferences to be drawn.

It should be understood that for ease of description a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

In this context, the term network device refers to any device capable of communicating via and/or as part of a network. Network devices may be capable of sending and/or receiving signals (e.g., signal packets), such as via a wired or wireless network, may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices or one or more server devices, as appropriate. Along similar lines, references to a "database" are understood to mean, one or more databases and/or portions thereof, as appropriate.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term transparent refers to devices communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network.

The Internet refers to a decentralized global network of interoperable networks, including devices that are part of those interoperable networks. The Internet includes local area networks (LANs), wide area networks (WANs), wireless networks, and/or long haul public networks that, for example, may allow signal packets to be communicated between LANs. The terms world wide web (WWW), web, and/or similar terms may also be used, although the terms "WWW" and/or "web" refer to a sub-portion of the Internet that complies with the Hypertext Transfer Protocol or HTTP. It is noted that there are several versions of the Hypertext Transfer Protocol. Signal packets, also referred to as signal packet transmissions, may be communicated between nodes of a network, where a node may comprise one or more network devices, for example. As an illustrative example, but without limitation, a node may comprise one or more sites employing a local network address. Likewise a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

Physically connecting a network via a hardware bridge as one example may be done, although other approaches also exist. A hardware bridge, however, may not typically include a capability of interoperability via higher levels of a network protocol. A network protocol refers to a set of signaling conventions for communications between or among devices in a network, typically network devices; for example, devices that substantially comply with the protocol or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance or substantial compatibility.

Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers. In contrast, a virtual private network (VPN) may enable a remote device to communicate via a local network. A router may allow communications in the form of transmissions (e.g., signal packets), for example, to occur from a remote device to a VPN server on a local network. A remote device may be authenticated and a VPN server, for example, may create a special route between a local network and the remote device through an intervening router.

Although claimed subject matter is not in particular limited in scope to the Internet or to the web, it may without limitation provide a useful example of an embodiment for purposes of illustration. As indicated, the Internet may comprise a worldwide system of interoperable networks, including devices within those networks. The Internet has evolved to a public, self-sustaining facility that may be accessible to tens of millions of people or more worldwide. Also, in an embodiment, and as mentioned above, the terms "WWW" and/or "web" refer to a sub-portion of the Internet that complies with the Hypertext Transfer Protocol or HTTP. The web, therefore, in this context, may comprise an Internet service that organizes stored content, such as, for example, text, images, video, etc., through the use of hypermedia, for example. A HyperText Markup Language ("HTML"), for example, may be utilized to specify content and/or format of hypermedia type content, such as in the form of a file or an "electronic document," such as a web page, for example. An Extensible Markup Language (XML) may also be utilized to specify content and/or format of hypermedia type content, such as in the form of a file or an "electronic document," such as a web page, in an embodiment. Of course, HTML and XML are merely example languages provided as illustrations. Claimed subject matter is not intended to be limited to examples provided as illustrations, of course.

As used herein, a "web site" may refer to a collection of related web pages, in an embodiment. Also as used herein, "web page" may relate to any electronic file or electronic document, such as may be accessible via a network, by specifying a URL for accessibility via the web, in an example embodiment. As alluded to above, in one or more embodiments, a web page may comprise content coded using one or more languages, such as, for example, HTML and/or XML, although claimed subject matter is not limited in scope in this respect. Also, in one or more embodiments, application developers may write code in the form of JavaScript, for example, to provide content to populate one or more templates, such as for an application. However, JavaScript is merely an example programming language. As was mentioned, claimed subject matter is not limited to examples or illustrations.

As used herein, the term "entry", "electronic entry", "document", "electronic document", "content", "digital content", "item", and/or similar terms are meant to refer to signals and/or states in a format, such as a digital format, that may be perceived by a user if displayed and/or otherwise played by a device, such as a digital device, such as, for example, a computing device. For one or more embodiments, an electronic document may comprise a web page coded in a markup language, such as, for example, HTML (hypertext markup language). In another embodiment, an electronic document may comprise a portion or a region of a web page. However, claimed subject matter is not limited in these respects. Also, for one or more embodiments, an electronic document or electronic entry may comprise a number of components. Components in one or more embodiments may comprise text, for example as may be displayed on a web page. Also for one or more embodiments, components may comprise a graphical object, such as, for example, an image, such as a digital image, and/or sub-objects, such as attributes thereof. In an embodiment, digital content may comprise, for example, digital images, digital audio, digital video, and/or other types of electronic documents.

As mentioned, with networks, such as the Internet, gaining tremendous popularity, and with the vast multitude of pages and/or other documents and/or other content, such as media content, and/or applications, becoming available, such as to users, via the World Wide Web (web), for example, it may be desirable to provide efficient and streamlined approaches to gather, organize and/or display information and/or other digital content that may be desired by and/or useful to a user. Internet-type business entities, such as Yahoo!, for example, may provide a wide range of content, such as information, applications, and/or digital content that may be available to users via the Web. In some circumstances, challenges may be faced in determining which content, such as information and/or other content, for example, to display, such as to a user, via a web page.

In general, conventional content retrieval systems may tend to focus on user experiences in which a user specifies his or her intent as explicitly as possible, and the systems may retrieve results in an attempt to meet the intent. Results may be ranked according to various criteria and may be presented to a user as a list. In some circumstances, a content retrieval system may be judged to be successful if the system is able to show a user a relatively small number of results while still at least partially meeting the user's expressed intent.

Conventional retrieval systems may be less desirable in situations where a user does not have and/or express a clear intent, for example, in situations wherein a user does not yet know what he or she is looking for, for example. A situation may include, for example, content "browsing" and/or dynamic search situations wherein a user may desire to be more broadly educated before the user may understand how to ask questions to better express intent. Other situations in which conventional retrieval systems may be less desirable may include situations wherein a user has an intent, but he or she is unable to readily translate that intent into a query. For example, a user may have a picture in his or her mind. A user may search for a song that the user has in his or her head, for example, and/or a user may seek images that resemble his or her childhood home.

Still other situations may include wherein a user's intent is multi-dimensional and/or multi-modal, such as, for example, where there are multiple different aspects of a set of possible results that may be of interest the user, as opposed to one or a few "top" results. For example, a user may desire to understand social network reactions to an event from a wide variety of different political opinions, for example. Additionally, example situations wherein conventional retrieval systems may be less effective may further include situations wherein the retrieval system is unable to accurately and/or reliably rank results, such as if results may involve subjective opinions and/or unsolved technical challenges. For example, a user may search for a chair that would go nicely in her living room.

Traditional methods of "browsing" may have potential shortcomings. For example, a user generally has little influence over content options presented at a given moment in time, whether it is a web page linking to other content and/or social streams referencing other content, to name a couple of possible situations. A branching of a user's navigation path may be determined by other individuals and/or by computer-implementable processes, for example, as opposed to being driven by a user's dynamic interests, for example.

Example embodiments in accordance with claimed subject matter may include systems and/or techniques for allowing a user to at least in part control his or her content discovery, for example, in situations wherein a user may not know and/or may be unable to more specifically articulate what the user is seeking and/or of interest.

For example, in an embodiment, a collection of content items, such as digital content items, may be displayed on a display of a computing platform. A two-or-more-dimensional spatial arrangement of content items, such as digital content items, of a displayed collection may comprise individual content items, such as digital content items, being positioned relative to other content items, such as other digital content items, based, at least in part, on analytic characterizations of one or more semantically-meaningful attributes of content items, for example. Also, in an embodiment, relative positions of the content items of the displayed collection may be dynamically rearranged at least in part in response to receiving a user interaction by way of an input device of a computing platform. In an embodiment, analytic characterizations of the one or more semantically-meaningful attributes of content items, such as digital content items, may include determining a degree of similarity among content items based at least in part on one or more semantically-meaningful attributes of content items. Also, in an embodiment, visual display of a spatial arrangement of content items of a displayed collection of items may be adjusted at least in part in response to receiving a user interaction by way of an input device of a computing platform, wherein the adjustment performs a filter operation and a pan operation. As used herein, the term "analytic characterizations" refers to attributes, features, characteristics, and/or qualities derived by analysis, for example, of content items, such as, for example, digital content items. In an embodiment, analysis of content items, such as digital content items, may be performed by computer-implementable processes.

FIG. 1 is an illustration of an example representation of a collection of digital content 110, for example, displayed on an example embodiment 100 of a client computing device. In an embodiment, a user experience may commence by user selection of a collection of content, including digital content, that may be of interest to the user. For example, a user may explicitly enter a query, such as "boots" as depicted at 106 in FIG. 1. Additionally, in an embodiment, a user may select a vertical category 104 in which to restrict results, such as, for example, "clothing" or "music". Also in an embodiment, a user may provide one or more examples of items he or she may be interested in, such as, for example, a picture of a red dress. This example situation may be referred to as "query-by-example". In an embodiment, a user may intend for individual items to be representative of his or her interests, for example, analogous to an "OR" query in traditional boolean search. Also in an embodiment, a user may intend for common, salient aspects across a set of examples provided by a user to be utilized in a query, perhaps analogous to an "AND" query, for example.

Additionally, in an embodiment, a user may provide a low-fidelity proxy, for example, of an item in which he or she may have interest. For instance, a simple finger-painted drawing on a tablet or by humming a fragment of a melody may be provided. This may be referred to a "query-by-sketch", for example. In an embodiment, a user may navigate a topology of categories, such as, for example, "clothing">"women's">"evening wear". A user may select a collection of content, such as digital content, that the user's social connections and/or friends on one or more social networks may have collected, favorited, and/or otherwise curated, in an embodiment. For example, a user may select a friend, and may select a collection from a list of that friend's collections. In another example, an assortment of a user's friends' collections may be dynamically updated over time on a home page in reverse chronological order. Further, in an embodiment, a collection of digital content that may be of interest to a user may be predicted. For example, a collection of digital content may be predicted based at least in part on a history of a user's interaction, a user's social network, recent items, and/or items that other users similar to a user may have found interesting.

In an embodiment, utilizing one or more user interactions, such as the examples mentioned above, a collection of digital items may be generated. As used herein, an "item" may represent a unit of content, such as, for example, a "digital content", such as an image, a chunk of text, a video clip, an audio clip, and/or some combination thereof. In an embodiment, digital content, for example, may have one or more possible views. As used herein, a "view" may comprise a way to display content, such as digital content. As an example embodiment, an image may represent itself, a frame of a video object may represent that video object, and/or an audio item may be represented by a visualization of one or more audio item properties and/or an image associated with that audio file, such as album cover art, for example. Of course, claimed subject matter is not limited in scope to the specific examples described herein.

FIGS. 1-11 show example grayscale images of shapes. However, embodiments in accordance with claimed subject matter are not limited to images generally, and are not limited to grayscale images more specifically. In an embodiment, a subset of digital content, for example, may be displayed and/or a schematic diagram and/or cartoon of underlying operations being performed may be illustrated. This may be done to help a user better understand a browsing and/or searching experience and/or to entertain a user during a delay that may be experienced by the user during processing, as examples.

Referring again to FIG. 1, images may be dynamically organized (or reorganized) into a spatial arrangement. In an embodiment, an example spatial arrangement may comprise semantic map 112. For example, semantic map 112 may comprise an interactive, zoomable visual presentation of digital content 114, wherein a spatial arrangement of a set of individual digital content items may be determined at least in part in accordance with semantically-meaningful attributes of individual digital content and its relationship to other digital content in collection 114. In an embodiment, semantic map 112 may comprise a 2D, (2+1)D, 3D, or (3+1)D space 110 to give appearance (e.g., an illusion) of operating in a physical world. Note that a "+1" dimension as used herein denotes time. For example, a layout of digital content items may be animated in such a way as to convey an additional content source, in an embodiment. As used herein, "semantically-meaningful attribute" refers to an attribute having subjective and/or objective meaning to a user, such as, for example, an attribute having contextual meaning over a set of items having potentially related attributes.

In an embodiment, a technique for determining a spatial arrangement may be based, at least in part, on similarity. That is, in an embodiment, items may be arranged such that similar items are placed in closer proximity than for non-similar items. For example, the more similar two items are, the closer they may be on a semantic map, such as map 112. Similarity may be determined based at least in part one or more of a number of factors, including, for example, image-type features, such as color, shape, and/or object-level features such as faces, text-based features, such as tags and/or other metadata, audio-type features such as spectral properties, and/or collaborative, social, attributes. Spatial arrangement may also be determined at least in part by orienting different features in different regions of a space (e.g., field of view on a display), in an embodiment. For example, "red" items may be distributed in one region of a semantic map, and "blue" items may be distributed in another region.

An example embodiment illustrated in FIG. 1 may comprise a collection of items wherein individual digital content may represent one or more toys, for example. In an embodiment, individual items 114 may comprise a shape, such as for example, a circle, diamond, star, or triangle, and a color represented by grayscale intensity, for example. In an embodiment, shape and/or color features may, as an example, determine at least in part individual digital content location on a semantic map, such as map 112, via similarity. In an embodiment, items with similar colors may be more likely to be near each other than items with dissimilar colors. Additionally, in an embodiment, items with similar shapes are more likely to be near each other than items with dissimilar shapes. In an embodiment, spatial alignment of individual items may be based according to color with a higher priority than based on shape, although claimed subject matter is not limited in scope in this regard.

Additionally, in an embodiment, map items may be displayed on a grid for reasons of aesthetics and/or ease-of-interaction. For example, individual items may be placed on or at integer x, y(, z) locations. Further, in an embodiment, whether or not on a grid, some items, such as digital content item 118, may be larger in size than other items to signal something about an overall collection, for example, to emphasize what an item from a certain region looks like, and/or to signal something about those individual items. For example, individual items may be made larger to emphasize popular items, and/or to emphasize individual items with which a user has interacted in the past. For example, digital content item 118 may comprise an item that has a larger number of favorites than other items in a collection.

In an embodiment, example user interactions with display 110 of FIG. 1 may comprise interactions that result in a selection of one or more digital content items. For example, a user may select one or more items of digital content to retrieve additional information about an item, and/or for performing additional interactions with an item. For example, with mouse and/or touch display interfaces, user interaction may comprise "clicking" on an item. For a touch interface, a click may comprise a finger press of a short duration, for example. For a keyboard interface, arrow keys may be pressed by a user to navigate to an individual item with which to interact.

Spatial-gesture interfaces, for example, as provided by hand or limb tracking systems, and/or those augmented by wand devices may also be utilized to select items by way of 3D movements and/or indicative gesture-transients, such as a grasp or flick movement. Other example interactions may also select an item as a byproduct. For example, a user may select an item from a location off a map, such as, for example, from a user's history, and/or from a URL specific to an item, which may result in that item being selected. In an embodiment, one or more display positions, such as, for example, an image closest to the center, may be selected by default.

In response to a digital content item being selected, an item may be visually highlighted or otherwise altered in a map. For example, a border, such as border 116, may be displayed around a selected item. Other examples of highlighting selected items may include increasing a size of a selected item, altering a coloring and/or opacity of a selected item, and/or altering the coloring and/or opacity of non-selected items. Additionally, in an embodiment, a selected item may be highlighted in a details and/or preview window, such as pane 140, for example. Also, in an embodiment, additional interactive elements, such as elements 146, and/or additional aspects, such as aspect (e.g., features) 142, related to a selected item may be displayed. In an embodiment, a user may save an item to a collection, and/or share an item to other users and/or other online social networks. Additional interactive elements may be displayed, such as at item 116, for example, and/or may shown in details/preview pane 140. Also, in an embodiment, a display may transition between zooming "out" to show interactive elements and aspects in details/preview pane 140 and zooming "in" to show interactive elements on the item, such as item 116.

Figure 2:
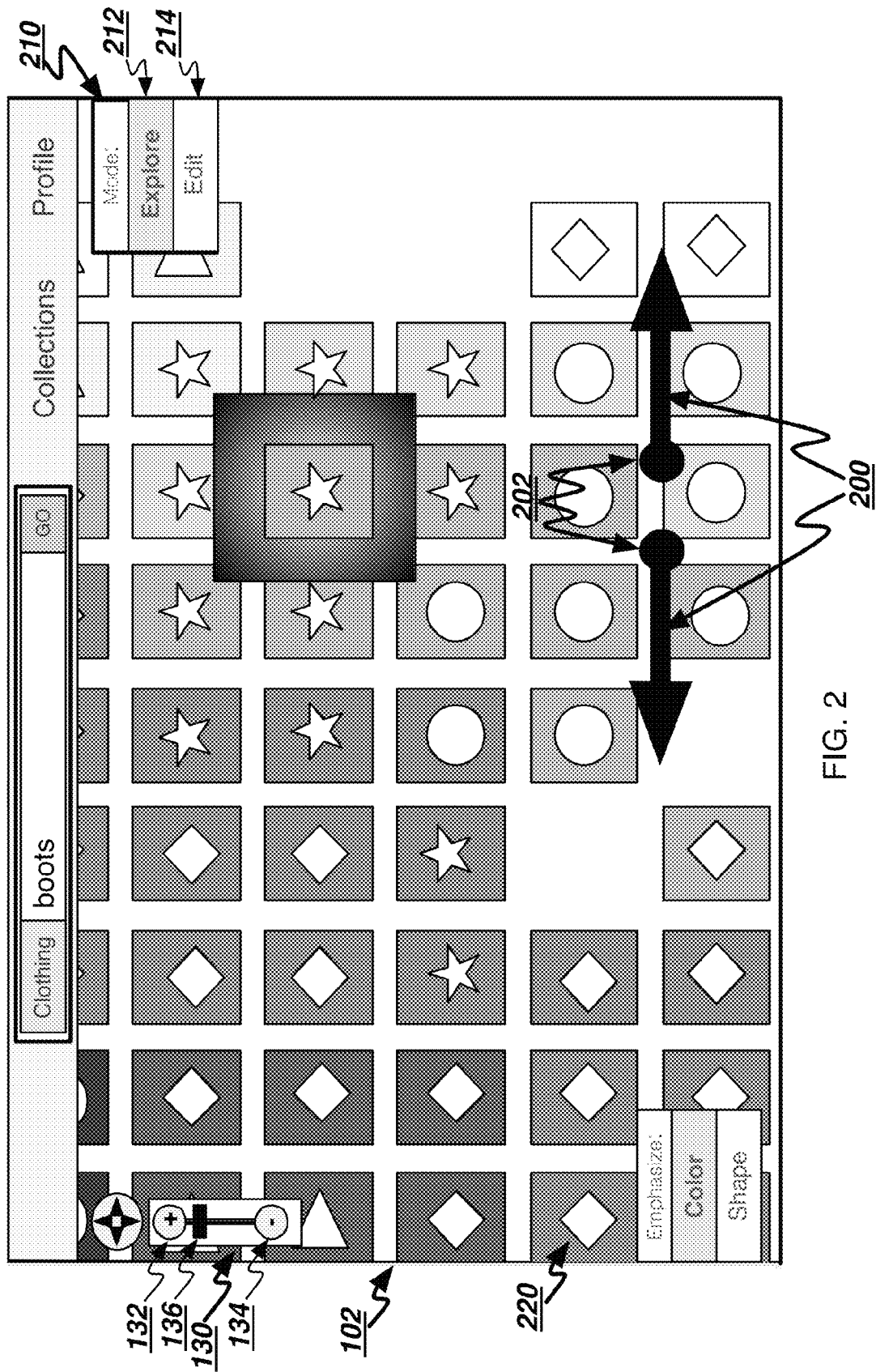
FIG. 2 is an illustration of an example representation of a collection of digital content displayed on a computing device, wherein the representation incorporates an example zoom operation, according to an embodiment.

FIG. 2 is an illustration of an example representation of a collection of digital content displayed on a computing device, wherein the representation incorporates an example zoom operation, according to an embodiment. In an embodiment, zooming in may display more details on fewer items, and zooming out may provide a broader view of more items and/or may summarize which type of item is in which region of a map. The example depicted in FIG. 2 illustrates a view a user may obtain if, beginning with the example view depicted in FIG. 1, a user zooms into a region of map 112 near selected item 116. Conversely, zooming out by substantially the same amount would substantially restore the view to that depicted FIG. 1. In an embodiment utilizing a mouse interface, zooming may be accomplished with a user manipulating a mouse wheel, such as, for example, spinning a mouse wheel forward to zoom in and/or spinning a mouse wheel backward to zoom out. Other example zooming interactions may comprise a user utilizing a two finger drag on an Apple Mac OS X track pad, in an embodiment. Of course, claimed subject matter is not limited in scope to the specific illustrations and/or examples described herein.

For embodiments incorporating a touch interface, zooming may be accomplished, for example, by holding two fingers, for example at points 202 depicted in FIG. 2, and expanding the two fingers as indicated by arrows 200 to zoom in or by bringing the two fingers closer together to zoom out, for example. Also, in an embodiment, one or more user interactions with one or more controls on a client computing device may induce programmatic zooms. For example, double-clicking a mouse button or double-tapping on touch interface on an item, such as on item 114, may prompt a client computing device display to zoom "into" that item image. Additionally, in an embodiment, a zoom bar 130 may be displayed, wherein the zoom bar may comprise a button 132 for zooming in, and a button 134 for zooming out. Further displayed, in an example embodiment, is a zoom status knob 136 that may move monotonically with zoom level. Note that zoom status knob 136 depicted in FIG. 2 appears closer to zoom-in button 132 than it is in FIG. 1. Also, in an embodiment, a user may select a point along a zoom bar range to jump to a desired zoom level. In additional to zooming via zoom bar 130, keyboard zoom controls may be implemented, such as, for example, a "+" key that zooms in and a "−" key that zooms out.

In an embodiment, altering a zoom level may adjust a rendered perspective as if a user is moving through a 3D space containing the map, for example, much in the same way that a first-person-shooter video game may adjust a rendered 3D model "world" as a game-player navigates that world with video game controls. Effects, such as parallax, may enhance the illusion of a 3D world to a user's visual system. Additionally, presentation and/or geometry of items may be altered as a user zooms, in an embodiment. This may be in addition to altering presentation of item details and/or various aspects at different zoom-levels. An example of altering presentation and/or geometry of items as a user zooms may comprise iterative selection refinement, described below in connection with FIG. 3.

Figure 3:
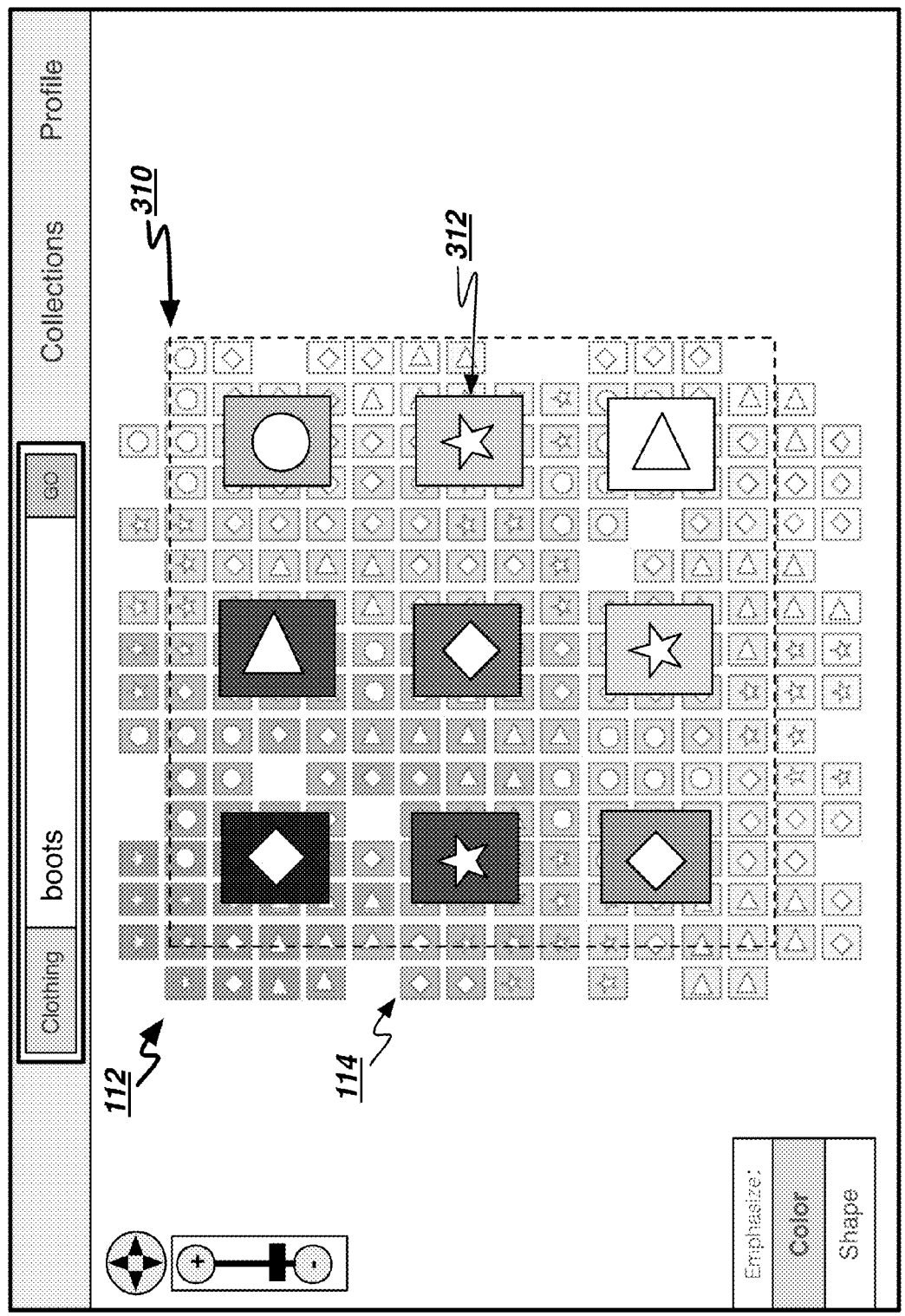
FIG. 3 is an illustration of an example representation of a collection of digital content displayed on a computing device, including an example refinement selector, according to an embodiment.

FIG. 3 is an illustration of an example representation of a collection of digital content displayed on a computing device, including an example refinement selector, according to an embodiment. In an embodiment, relative positions of items in space 110 may not be static, and individual items may be displayed multiple times, for example. In an embodiment, an iterative selection refinement process may present a number of discrete options to a user, and a user may select an item that may be more interesting or closer to what a user may be looking for. A selection by a user may bring the user to a different and perhaps better region of semantic map 112, and/or may bring another set of discrete options to for selection. Repetition of a refinement process, for example, may be analogous to a game of "20 Questions", wherein a system repeatedly asks "more like this or more like that" and narrows in on a targeted and/or desired outcome.

For example, FIG. 3 depicts a plurality of refinement selectors, such as refinement selector 312, within a refinement selector control region 310. Semantic map 112 may optionally remain visible, for example, with items such as item 114 having lower opacity, to give context to individual selections. For example, a user may pick a refinement selector, such as refinement selector 312, in region 310. In response, more options more similar to chosen refinement selector 312, for example, may be displayed, in an embodiment. Also, in an embodiment, selector control region 310 may be dismissed and a display may zoom into a specified area of semantic map 112, thereby yielding a view similar to that depicted in FIG. 2, for example. Utilizing one or more techniques, including those described herein, for example, a user may refine implicitly, such as by navigating to specific regions of semantic map 112, or explicitly, such as by choosing a discrete refinement selector. Further, in an embodiment, a related form of iterative selection refinement may comprise allowing a user to mark "positive" example items and "negative" example items. In response, a display system of a client computing platform, for example, may show items more similar to the positive example items and less similar to the negative example items.

Figure 4:
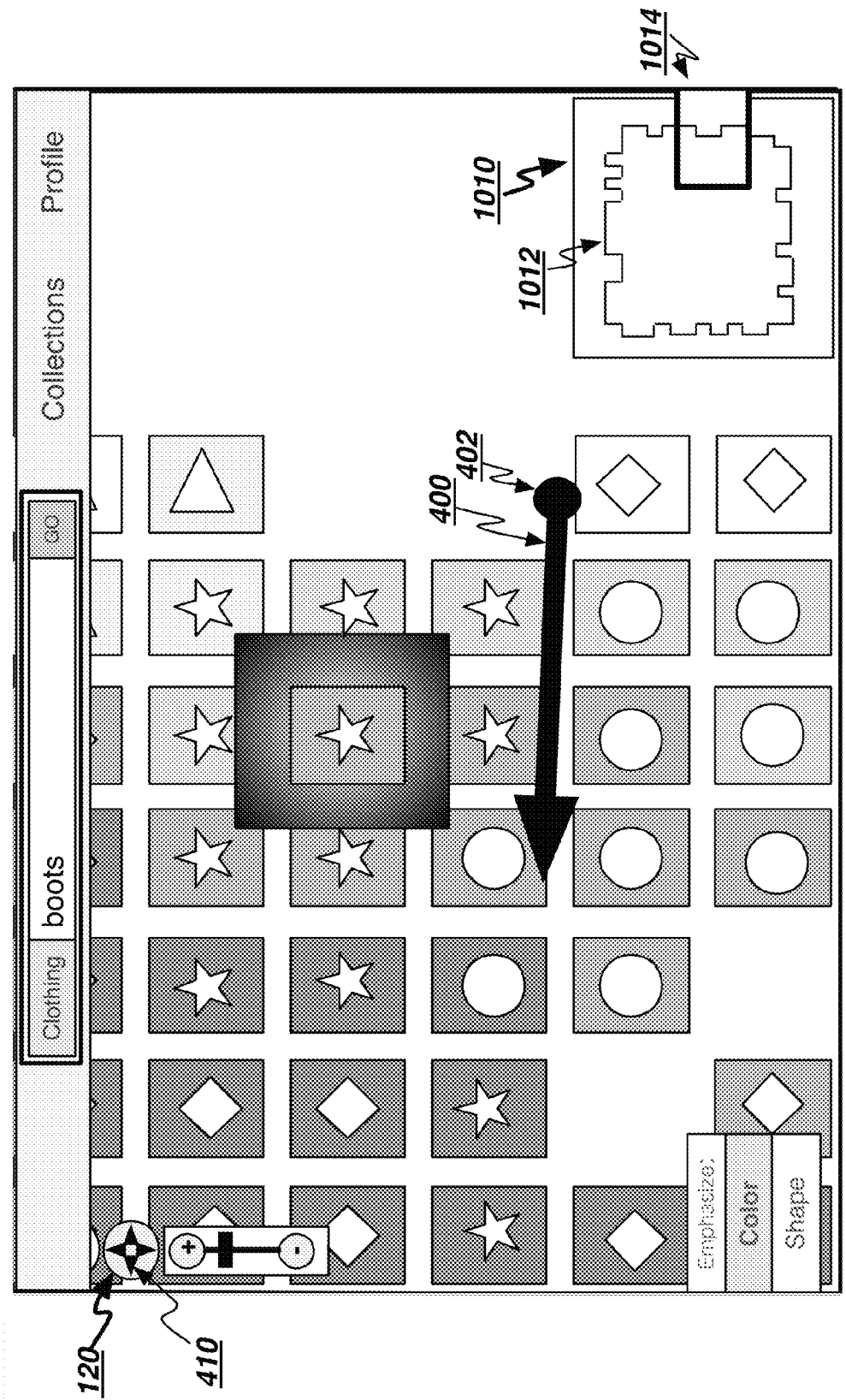
FIG. 4 is an illustration of an example representation of a collection of digital content displayed on a computing device, wherein the representation incorporates an example pan operation, according to an embodiment.

FIG. 4 is an illustration of an example representation of a collection of digital content displayed on a computing device, wherein the representation incorporates an example pan operation, according to an embodiment. In an embodiment, a pan operation may be used to change which items are visible or to focus on a region of a map, such as semantic map 112. FIG. 4 depicts an example view a user would obtain if, starting with the view depicted in FIG. 2, the user were to pan map view 102 to the left. Conversely, zooming to the right by substantially the same amount would substantially restore the view depicted in FIG. 2. For mouse interfaces, a pan operation may be accomplished by a user by dragging a mouse, for example, by clicking and holding down a mouse button, moving the mouse, and releasing the mouse button. On a touch interface, a pan operation may be signaled by a user pressing a finger on a spot on a display, such as spot 402, and by moving in a direction indicated by example arrow 400. Also, in an embodiment, it may be desirable to adjust displayed content such that a point displayed under a finger remains under the finger as it moves, for example. Further, on a gesture interface, a user may indicate a pan operation by way of a compound-gesture, such as, for example, a sweep with a right hand while maintaining a canonical indicator gesture with a left hand, and/or by manipulating a wand or similar device in conjunction with a button press, in an embodiment.

In an embodiment, a pan control 120 may be displayed, with buttons, such as button 410, for panning in different directions. For example, a selection of button 410, such as be way of a mouse click, for example, may pan a map view to the left. Although pan control 120 depicted in FIG. 4 includes four buttons (for north/east/south/west), other embodiments may provide for pans in any direction (e.g. north-by-northwest) based at least in part on the radial selection, and/or may optionally display additional buttons. Additionally, embodiments in accordance with claimed subject matter may include, for example, controls that may induce programmatic pans. For example, clicking on a landmark item, discussed below, may pan from a currently selected and/or viewed item to a landmark item.

Figure 5:
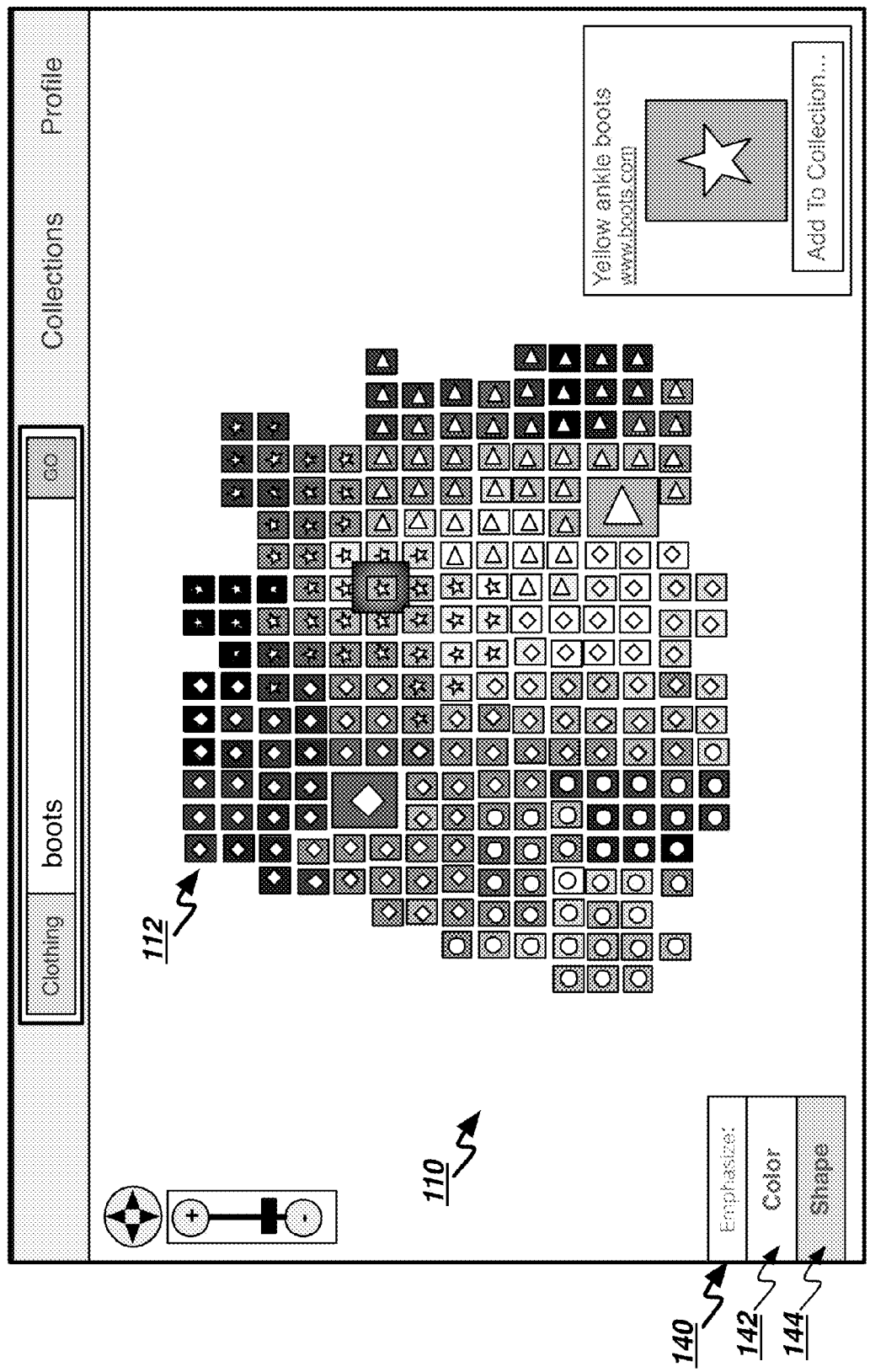
FIG. 5 is an illustration of an example representation of a collection of digital content displayed on a computing device, wherein the representation emphasizes shape, according to an embodiment.

FIG. 5 is an illustration of an example representation of a collection of digital content displayed on a computing device, wherein the representation emphasizes shape, according to an embodiment. For the example display depicted in FIG. 5, items in semantic map 112 may be dynamically rearranged. In an embodiment, an arrangement of items on map 112 may be determined based at least in part on a weighted combination of factors, including, for example, image-type features, such as, for example, color, shape, object-level features, text-type features, such as, for example, tags and/or other identifiers, collaborative features, and/or or social features. In an embodiment, different factors and different weightings of those factors may be useful to different users, or for the same user at different times, or even for the same user at different points in a given search session, for example.

For this reason, embodiments in accordance with claimed subject matter may incorporate techniques to allow for a user to rearrange a map, such as semantic map 112, based at least in part on different factors and/or different weightings of those factors. For the example depicted in FIG. 5, a listing of factors 140 may be displayed. In an embodiment, discrete options of combinations, such as a button 142 labeled "Emphasize color" and/or another button 144 labeled "Emphasize shape" may be displayed. Also, in an embodiment, discrete weighting options for different factors, such as, for example, different options for how much weight to put on "color", and/or continuous scalings of different factors, such as, for example, a slider that allows any weighting in a specified range, may be displayed. For the example depicted in FIG. 5, semantic map 112 emphasizing (grayscale) "color" depicted in FIG. 1 may be re-arranged to emphasize "shape". For example, items with similar shapes are closer on the map. To a lesser extent, for this example, items with similar colors may be more likely to be closer on the map. Of course, claimed subject matter is not limited in scope in these respects.

Figure 6:
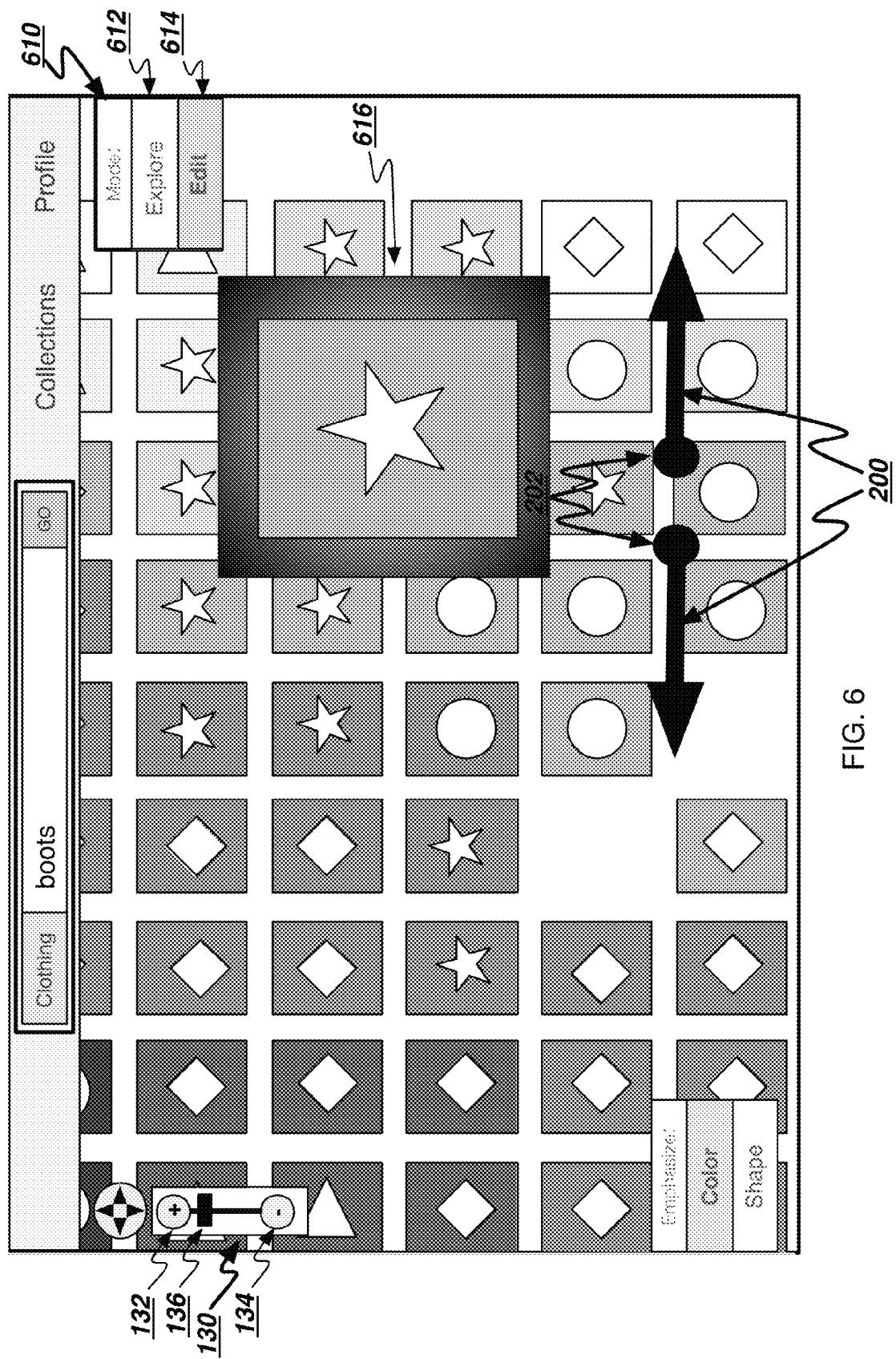
FIG. 6 is an illustration of an example representation of a collection of digital content displayed on a computing device, wherein the representation incorporates example user interaction, according to an embodiment.

FIG. 6 is an illustration of an example representation of a collection of digital content displayed on a computing device, wherein the representation incorporates example user interaction(s), according to an embodiment. In an embodiment, a user may adjust position of items or change relative sizes, for example. A user may do this to satisfy his or her own tastes and/or preferences, or user interactions may be utilized as a way to "train" a system for better and/or more personal results in the future, for the user and/or for others, for example. Alternatively, in an embodiment, a user may wish to share an arrangement with other users, and/or may want to improve and/or highlight an aspect of an arrangement. In an embodiment, a user may differentiate interactions intended to edit and/or adjust items from interactions intended to explore.

In an embodiment, one example technique may include a modal interaction, for example, as depicted as mode buttons 610 in FIG. 6. A user may select an "explore" mode, for example, by selecting "explore" box 612 depicted in FIG. 6, or may select an "edit" mode, for example, by selecting "edit" box 614 depicted in FIG. 6. In edit mode, user interactions may result in an editing of items rather than navigating through a collection. For example, in an embodiment, a user pressing two fingers, represented by points 202 in FIG. 6, and moving the fingers away from each other, such as represented by arrows 200 in FIG. 6, may result in an increase in size for an item, such as item 616, for example. In an embodiment, a substantially similar interaction 200 may additionally be used for zooming-in if in explore mode, as depicted in the example illustrated in FIG. 2. Further, in an embodiment, dragging-type user interactions may pan map 112 if in "explore" mode and may move an item's relative position if in "edit" mode. In an additional embodiment, advanced multi-touch interactions may differentiate user interactions. For example, three or four-finger pinching on a touch display may denote image resizing. Also, it may be inferred whether an interaction may be designed to navigate or to edit based at least in part on context of a user behavior, for example.

Further, in an embodiment, different view types may be designated as more appropriate for different explorations and/or for different stages of a single exploration. For example, a user may select different view types, which may affect an entire collection of items or some relevant subset (e.g. the currently visible subset of items in the collection). In an embodiment, it may be more convenient and/or more familiar for a user to view maps in fewer dimensions. For example, arrangement of a map may be restricted to lie along a line rather than arranged throughout a plane or a 3D space. A restriction may encourage restricting user interaction and/or movement of a map along a single dimension, rather than in 2D or 3D. One motivation for this might be to help a user exhaustively inspect items, for example, giving a user greater confidence that he or she has seen all items, or all items in a region and/or of a specified type. Though partially restricted in dimensionality, such a map view may still employ one or more of the other interactions described herein, such as, for example, zooming and/or panning. Also, in an embodiment, user interactions may be modified as appropriate for a map view shape. For example, panning may be more restricted, in an embodiment. An example map display with more restricted user interaction may be found at FIG. 11, although claimed subject matter is not limited in scope in these respects.

In other embodiments, a map display may comprise a "collage" view, for example, wherein digital content items may be arranged substantially in accordance with more aesthetic criteria, such as to more to convey a "feel" for a collection than to aid in exploration of individual items of a map, such as semantic map 112. In an embodiment, an arrangement of a "collage" view of a mapping of digital content items may be based, at least in part, on user-generated adjustments. Also, in an embodiment, user-generated sizing and/or arrangement may be supplemented and/or aided by programmatic sizing and/or arrangement, for example. Programmatic layout criteria may generally put different emphasis on factors like aesthetics of an overall display, as well as possibly highlighting diversity in a collection set, and may also have greater heterogeneity in image sizing and/or spacing, in an embodiment.

Figure 7:
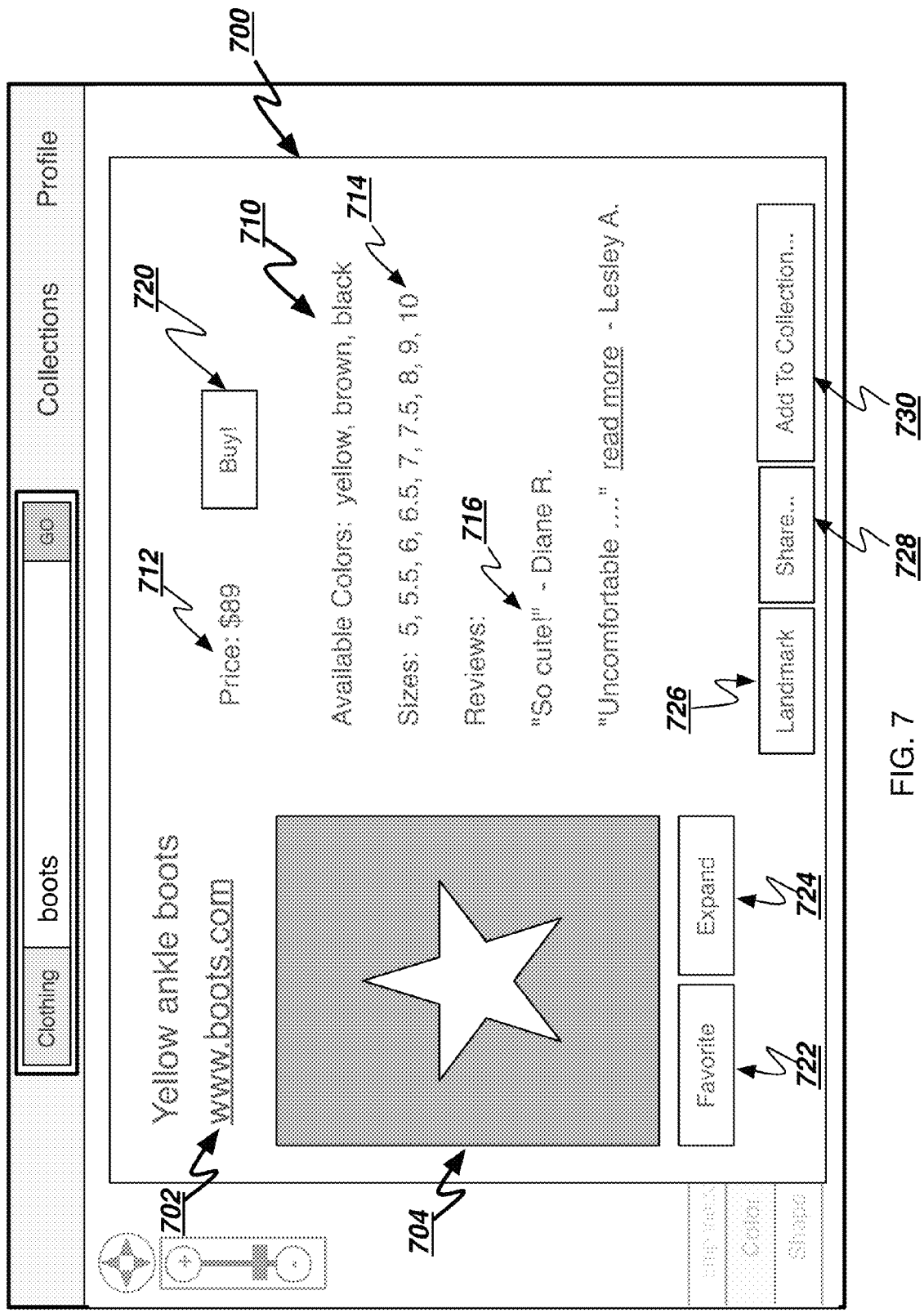
FIG. 7 is an illustration of a representation of an example digital content from a collection of digital content displayed on a computing device, wherein the representation incorporates additional details related to the digital content, according to an embodiment.

FIG. 7 is an illustration of a representation of example digital content from a collection of digital content displayed on a computing device, wherein the representation incorporates additional details related to the digital content, according to an embodiment. In an embodiment, view type may be changed based at least in part on a user's interaction, for example, by inferring an appropriate view type for individual stages of user interaction. An example may comprise transitioning a 1D map at least in part in response to a user zooming far enough into a 2D or 3D map, in an embodiment.

As depicted in FIG. 7, a "Details" view, such as view 700, may display additional aspect (e.g., features) about one or more individual items. In an overall view of a digital content set, for example, there may be too many items for a system to be able to display relevant aspects (e.g., features) for all items at once. Even in cases where this may be possible, displaying more details for individual items may typically clutter a display and may be more confusing to a user. Therefore, in an embodiment, additional details may be displayed in a details view, such as view 700. In an embodiment, a details view may include one or more links 102 to a source of an individual item, such as item 704, and/or a details view, such as view 700, may include larger and/or higher-resolution image(s) for an item, such as item 704. A details view may also include, in an embodiment, aspects about an item, such as item 710, including, for example, price 712, buying options 714, and/or reviews 716. Additionally, a details view, such as view 700, may also include item interactions, including, for example, an option to buy an item, depicted as 720 (e.g., buttons or links to select).

Figure 8:
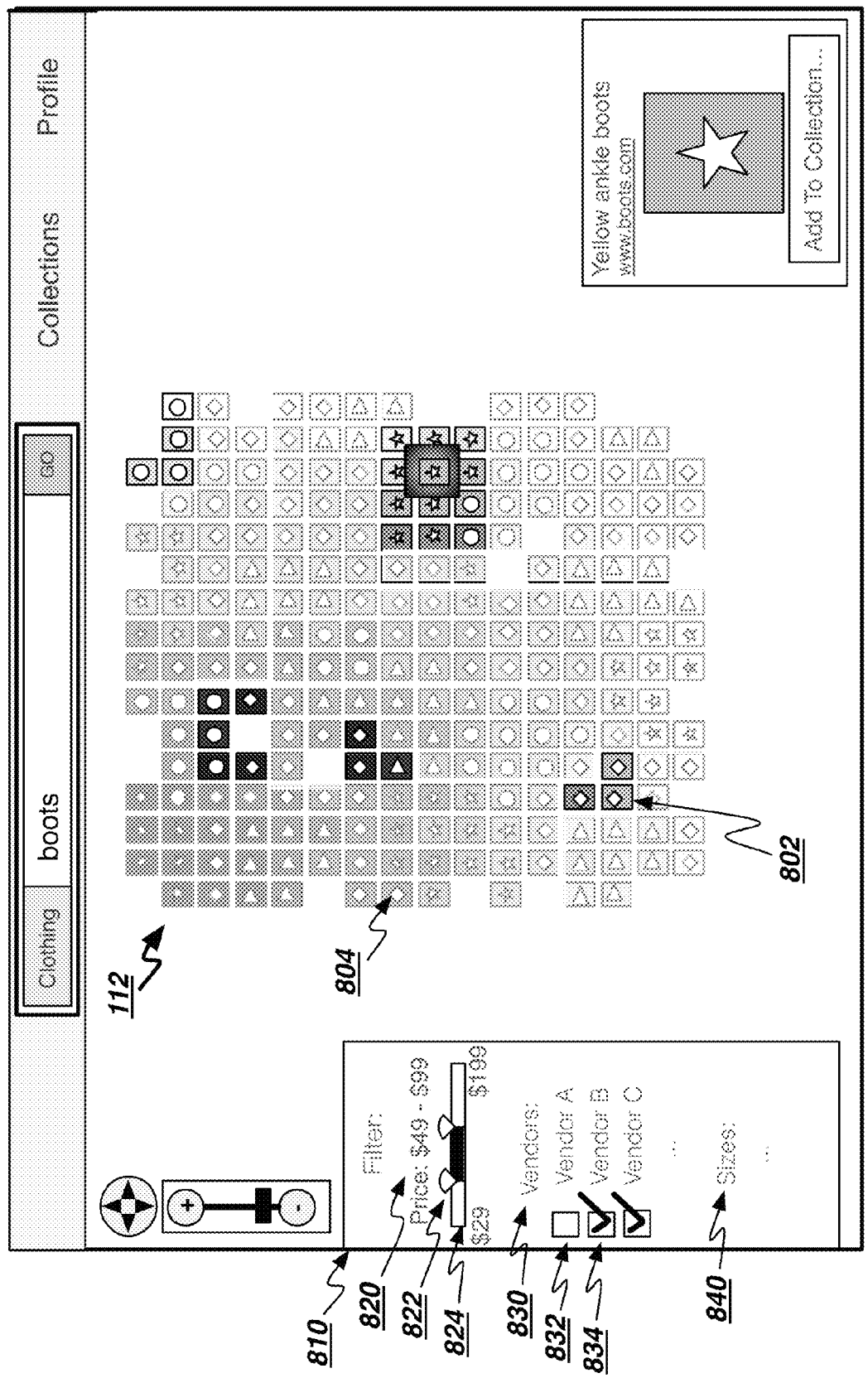
FIG. 8 is an illustration of an example representation of a collection of digital content displayed on a computing device, wherein the representation incorporates example highlighting, according to an embodiment.

FIG. 8 is an illustration of an example representation of a collection of digital content displayed on a computing device. In an embodiment, additional user interactions with a displayed set of digital content items may include, for example, highlighting and/or filtering. For example, a user may select one or more criteria. At least in part in response to a user selection of one or more criteria, a client computing platform may visually emphasize a subset of displayed items that meet, or at least substantially meet, criteria selected by a user. Additionally, in an embodiment, a client computing platform may visually de-emphasize a subset of displayed items that do not meet, or at least substantially meet, those criteria.

For the example depicted in FIG. 8, a filter control area, such as filter control area 810, may display indications of a number of criteria. For example, user-selectable criteria may comprise price 820, vendors 830, and/or sizes 840, in an embodiment. Also in an embodiment, a user may interact with a slider 824 and/or checkboxes 832 to specify ranges and/or discrete values that may, in effect, designate the individual items to be highlighted, or to not be filtered, for example. FIG. 8 depicts a price range 822 of $49-$99 and vendors 834 B and C, and a vendor 832 A remains unchecked, for this example. For the example of FIG. 8, map 112 may highlight elements 802 that satisfy or at least substantially satisfy selected criteria, and may filter elements 804 that do not satisfy or at least do not substantially satisfy selected criteria. In additional embodiment, techniques for highlighting, for example, may comprise placing a border around highlighted items, make highlighted items slightly larger, and/or may comprise animating highlighted items, such as, for example shaking items by rotating them back and forth in their plane around their center point, although claimed subject matter is not limited in scope in these respects.

Rather than visually de-emphasizing items, such as items 804, items may be removed altogether from map view 112, in an embodiment. Also, in an embodiment, space previously occupied by removed items may remain empty, or items may be rearranged to fill in some of the empty space. In an embodiment, items may be rearranged at least in part by performing coordinate-finding processes on at least a subset of remaining items. In an embodiment, coordinate-finding processes may be pre-computed in situations using common and/or typically filtering criteria. Alternatively, in an embodiment, one or more simpler, and potentially "greedier" processes may be performed to provide quicker re-arrangement and/or to save on computation costs, such as power consumption, for example. An example of the latter may include simply pulling remaining items toward the center of a view to take the place of vacated items.

Other examples of criteria, such as that a user may select, include, but are not limited to, items having certain tags, items in a category or subcategory, such as, for example, "men's" and/or "women's", and/or items viewed and/or collected and/or favorited by members of a user's social network. Also, in an embodiment, rather than explicitly selecting criteria as depicted at 810 in FIG. 8, a user may select an item and a criteria type, and a client computing platform display may highlight items that share a selected criteria type with a selected item. In another embodiment, a user may select a mode of operation wherein a user selects multiple items to highlight. Additionally, in an embodiment, shortcuts may be provided to allow item-level user interactions with highlighted items. For example, a user may add a plurality of highlighted items to a specified collection with a single click and/or other interaction.

Figure 9:
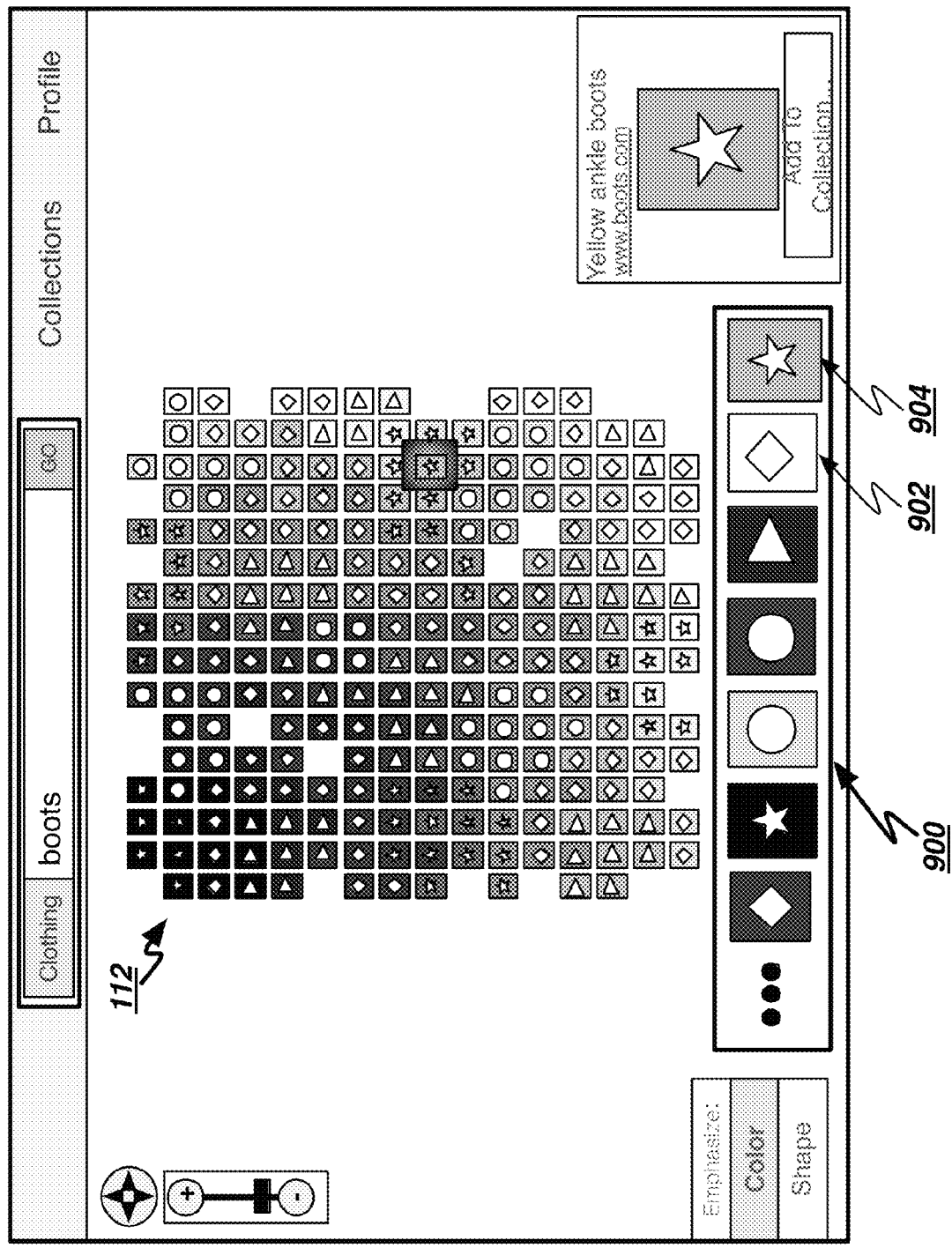
FIG. 9 is an illustration of an example representation of a collection of digital content displayed on a computing device, wherein the representation incorporates example landmark items, according to an embodiment.

FIG. 9 is an illustration of an example representation of a collection of digital content displayed on a computing device, wherein the representation incorporates example landmark items, according to an embodiment. For example, FIG. 9 depicts an example landmark control 900 with landmark items 902 and 904. In an embodiment, a user interaction, such as a mouse click, with a landmark item may result in a jump in view to a part of a map, such as map 112, represented by the landmark item. In an embodiment, a jump in view to an item represented by a landmark item may comprise a pan from a current position in a map to a landmark point. Additionally, in an embodiment, a change in view to a landmark point may include a programmatic zooming sequence, for example, such as described above in connection with FIG. 6 and FIG. 2. In an embodiment, a programmatic zoom sequence may comprise zooming out during a first part of a pan and zooming in during a last part of a pan.

In an embodiment, landmark items 900 may represent items that a user may desire for easy navigation access. For example, landmark items may be determined at least in part in accordance with a user's navigation history. For example, items with which a user has interacted may be displayed in reverse chronological order, in an embodiment. Example user interactions in this regard may comprise a user clicking on an item to add the item to a collection and/or displaying an item on a screen for a period of time. By tracking items in this manner, users may explore a digital content item collection more freely with a confidence that the user is less likely to lose track of items they've seen and/or otherwise interacted with.

Figure 10:
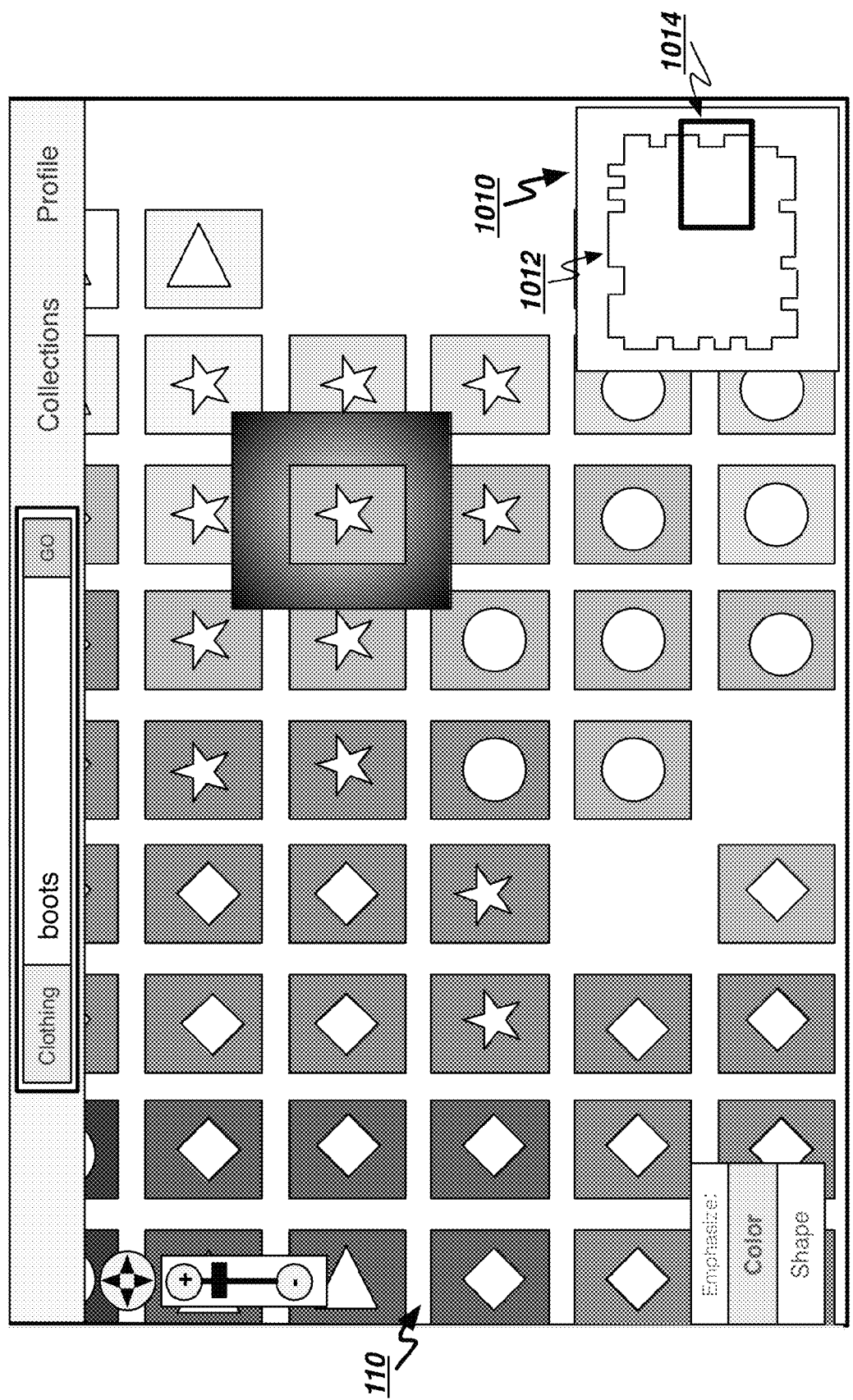
FIG. 10 is an illustration of an example representation of a collection of digital content displayed on a computing device, wherein the representation incorporates an example map location overview, according to an embodiment.

FIG. 10 is an illustration of an example representation of a collection of digital content displayed on a computing device, wherein the representation incorporates an example map location overview, according to an embodiment. If looking at a particular view of a map, such as map 110, a user may have difficulty remembering its location in an overall map. Therefore, in an embodiment, a visual indicator of map context may be displayed. An example is depicted in FIG. 10, wherein a "head's up display" 1010 comprises a silhouette 1012 of map 110 and a box 1014 depicting a section of map 110 currently visible in visible spatial area 102. In an embodiment, as a user navigates, for example, box 1014 may move to newly displayed regions of map 110. For example, in FIG. 4, note that visible box 1014 in head's up display 1010 has moved to the right of map silhouette 1012. In an embodiment, head's up display 1010 may not be displayed in situations where a user has zoomed out far enough to view most of the map.

In addition to having a user navigate his or her own way through a semantic space, such as map 110, a client computing platform may take control of the navigation, reminiscent of an auto-pilot on a plane. An example of such navigation may comprise automated panning and/or zooming when choosing between landmarks, as described above. Of course, claimed subject matter is not limited in scope in this respect. Another example of system-led navigation may comprise a playlist, wherein a system automatically navigates from item to item over time. For example, if the items are songs and/or videos, a playlist mode may play a song of video to completion, and in response to the completion, may pans and/or zoom to a different song or video item, play that song or video, and so on.

In an embodiment, an order of a playlist may be generated in accordance with aspects (e.g., features) gleaned through social connections, from editors, and/or from other curators. A playlist order may also be programmatically determined. For example, one technique determining or at least affecting a play order for a playlist may comprise stepping through a map along a particular direction. This example technique may offers continuity, since items near one another on a map tend to be more similar, and this example technique may also offer diversity, since over time playlist reaches different regions of a map. Additionally, in an embodiment, a user may take control of playlist navigation at any time through interactions with one or more digital content items in a map. In this manner, a user may have an ability to adjust a playlist if unsatisfied or otherwise desiring a change.

In an embodiment, a current search and/or playlist, for example, may be saved to enable later recreation. For example, a server computing platform may take a snapshot of items in a result set along with a query that produced the result set, thereby potentially reducing complications as result sets change over time. Additionally, a link to a saved search and/or playlist may be generated and may, for example, be shared via social networking systems, in an embodiment.

As a user interacts with an example embodiment of a mapping system, the system may dynamically adjust what is displayed to the user. For example, as a user signals additional preferences about items, whether explicitly or through behavior, such as, for example, a user tending to zoom into particular areas of a semantic map 102, the system may display more items similar to inferentially preferred items and/or adjust an arrangement of displayed items to reflect dimensions of similarity that inferentially correspond to interests of a user. For example, even if a user has not previously searched or filtered based on "red," the user may spend a portion of time looking at red items, in which case a system may detect that association and request more red items by explicitly identifying "red" as a common characteristic, or by requesting more items "like these items," for example. Similarly, a user may move around to look at "red" and "blue" variants of otherwise similar items, in which case a system may arrange items in a way to emphasize color, even if the user does not explicitly request color emphasis. Further, in addition to improving a given user's session, a process of examining and adjusting to users' interactions may be utilized to train components of the system for all users, in an embodiment.

In one or more embodiment, a number of user interactions may be common among individual items of a collection of digital content items. Controls for user interactions may be displayed in a preview pane, such as pane 140 depicted in FIG. 1, for an embodiment, and user interactions may be displayed, for example, in a details pane, such as pane 700 depicted in FIG. 7. An example of a user interaction that may be common among individual items of a collection may comprise an "add to collection" interaction. Example add to collection interactions are depicted at 730 in FIG. 7 and at 146 in FIG. 1. In an embodiment, an add to collection interaction may be utilized to create a collection of items, for example. In an embodiment, a collection of items may comprise a collection shared with a user. For example, a collection may comprise a "starter" collection, or may comprise a curated collection from other editors and/or guests, to name another example. Of course, claimed subject matter is not limited in these respects.

An additional example of a user interaction that may be common among individual items of a collection may comprise a "share" interaction. An example share interaction may be found, for example, at 728 depicted in FIG. 7. By way of a share interaction, a user may share one or more items of a collection with other users of a service or with other users of an online social network, for example. A share interaction may result in generation of a link, or other resource identifier, such as a uniform resource identifier (URL) specific to an individual item or collection of items, in an embodiment. In an embodiment, activation of a "share" link may result in display of an item in a context of a map and/or other view, for example.

Further examples of user interactions that may be common among individual items of a collection may comprise a "favorite" or "like" interaction, such as depicted at 722 in FIG. 7, and/or a "buy" interaction, such as depicted at 720 in FIG. 7, in an embodiment. Also, in an embodiment, items represented in a semantic map may be available for purchase, such as directly through a system interface or through a third-party web site, for example. Also, a commission, such as a percentage of an end sale, or an affiliate fee may be associated with a user "buy" interaction, in an embodiment. Still another example user interaction that may be common among individual items of a collection may comprise a "landmark" interaction such that a selected item may be included in a list of landmarks, such as described above.

An additional example of a user interaction that may be common among individual items of a collection may comprise an "expand" interaction that may result in an item in a map to increase in relative size within a map. An example expand interaction is depicted, for example, at 724 in FIG. 7. In an embodiment, for aesthetic reasons, a system may default to an increase in size of an item substantially in accordance with a unit of a smallest displayed item. Also, in an embodiment, an expand interaction of an item may result in an item increasing in relative size for other users, for example others in a user's network. For other users, an expansion of size may be made dynamically, in an embodiment, or changes in size may be accumulated and displayed periodically, in another embodiment. Users may also have an option to block dynamic changes, for example. Also, in an embodiment, an expand button, such as expand button 724, may be displayed during a "details" view in an embodiment, and, in another embodiment, an expand button may be displayed for individual items, for example.

Figure 11:
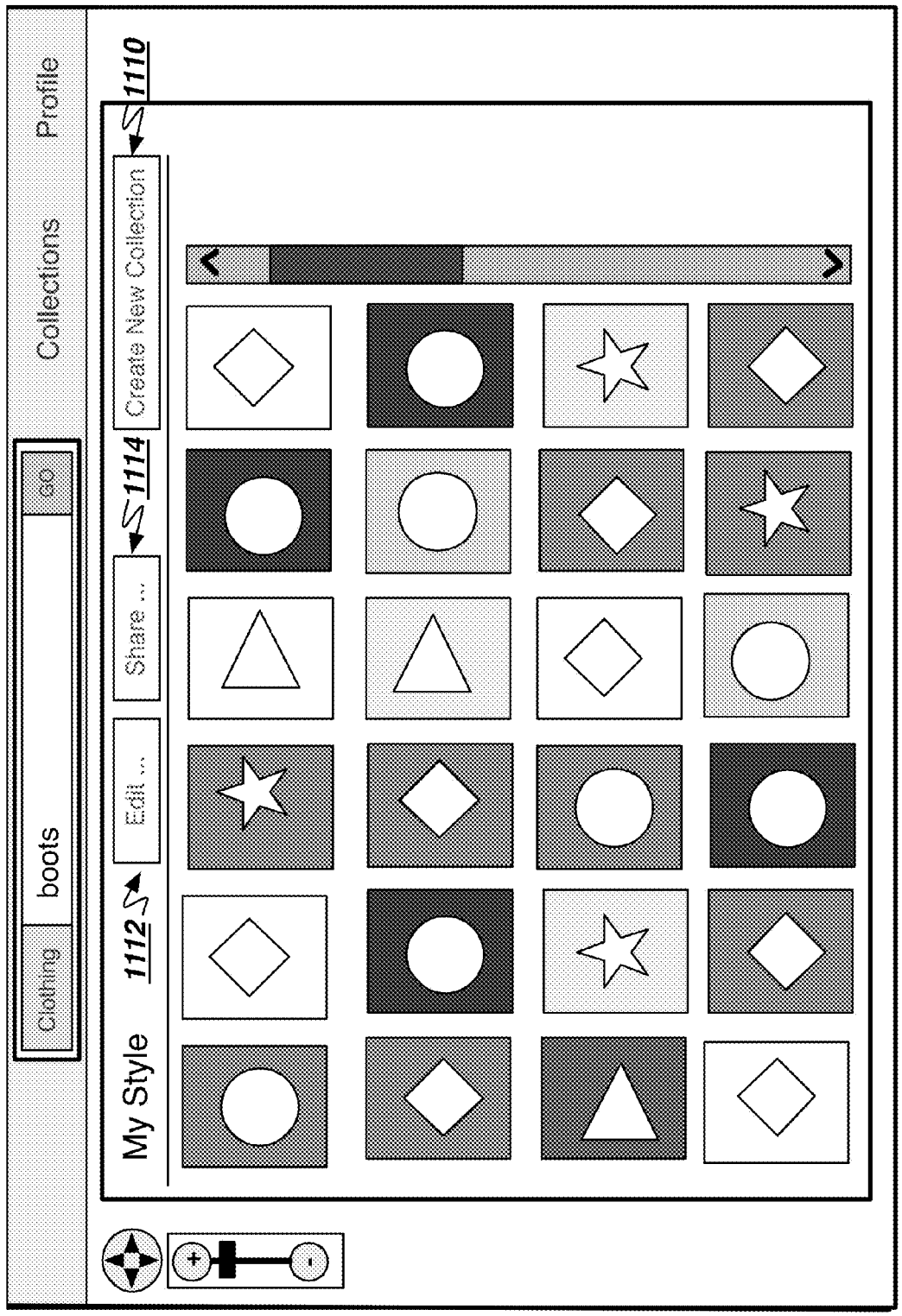
FIG. 11 is an illustration of an example representation of a collection of digital content displayed on a computing device, wherein the representation incorporates example user interaction, according to an embodiment.

FIG. 11 is an illustration of an example representation of a collection of digital content displayed on a computing device, wherein the representation incorporates example collection-type user interaction(s), according to an embodiment. An example of a user interaction that may be employed across a collection of items may comprise a "create" user interaction, as depicted as 1110 in FIG. 11. In an embodiment, a "create" user interaction for a collection may provide a user with a capability to give a name and/or a description of a collection. A collection may be organized into a hierarchy of collections, in an embodiment. Also, by way of a "create" interaction, for example, a user may employ a privacy setting, for example, to affect what may be visible to other users. In an embodiment, a collection may start as a blank collection, for example, or may start as a shared collection, in another embodiment.

Additional examples of user interactions that may be employed across a collection of items may comprise an "edit" user interaction, such as depicted at 1112 in FIG. 11. By way of an "edit" user interaction, a user may delete items, may delete collections, may rename collections, may change privacy settings, and so on, to name a few examples, although claimed subject matter is not limited in scope in these respects. A further example of a user interaction that may be employed across a collection of items may comprise an "share" user interaction, such as depicted at 1114 in FIG. 11. In an embodiment, a "share" user interaction for a collection may allow a user to share a collection with other users, such as other users of a subscription service, or other users of a social network, for example. Also, by way of a "share" user interaction, a user may create a URL specific to a collection, for example. Again, claimed subject matter is not limited in scope in these respects.

In an embodiment, a user may at time, request a link to a collection, item, user, and/or search result, for example, to share with other users. In an embodiment, a mapping system may operate from within a browser, such as a web browser, executed on a client computing platform. If operating in a web browser, a displayed URL may be dynamically updated so that re-opening a URL may return a user to approximately a prior user experience. For example, a system may dynamically update a URL box in response to a user viewing an item details window, so that copying and/or pasting the URL into a browser session may return a user to details of an item. In an embodiment, a system may be implemented, at least in part, in HTML5, and a system may accomplish dynamic URL updating without reloading of display assets and/or a client code, making the operation seamless or nearly seamless for a user.

In an embodiment, a link may also provide additional aspect (e.g., features) uniquely that may be useful to provide additional context. For example, for a saved search, an identifier of an item collection may be utilized to recreate a map, but the identifier, or link, for example, may also include search terms to provide context. Also, in an embodiment, a system may display "shortened" links, or URLs. In an embodiment, an additional request and/or button click may be asked from a user to save on time and/or the computation "expenses" that may be incurred in programmatically generating a link or URL, for example.

Figure 12:
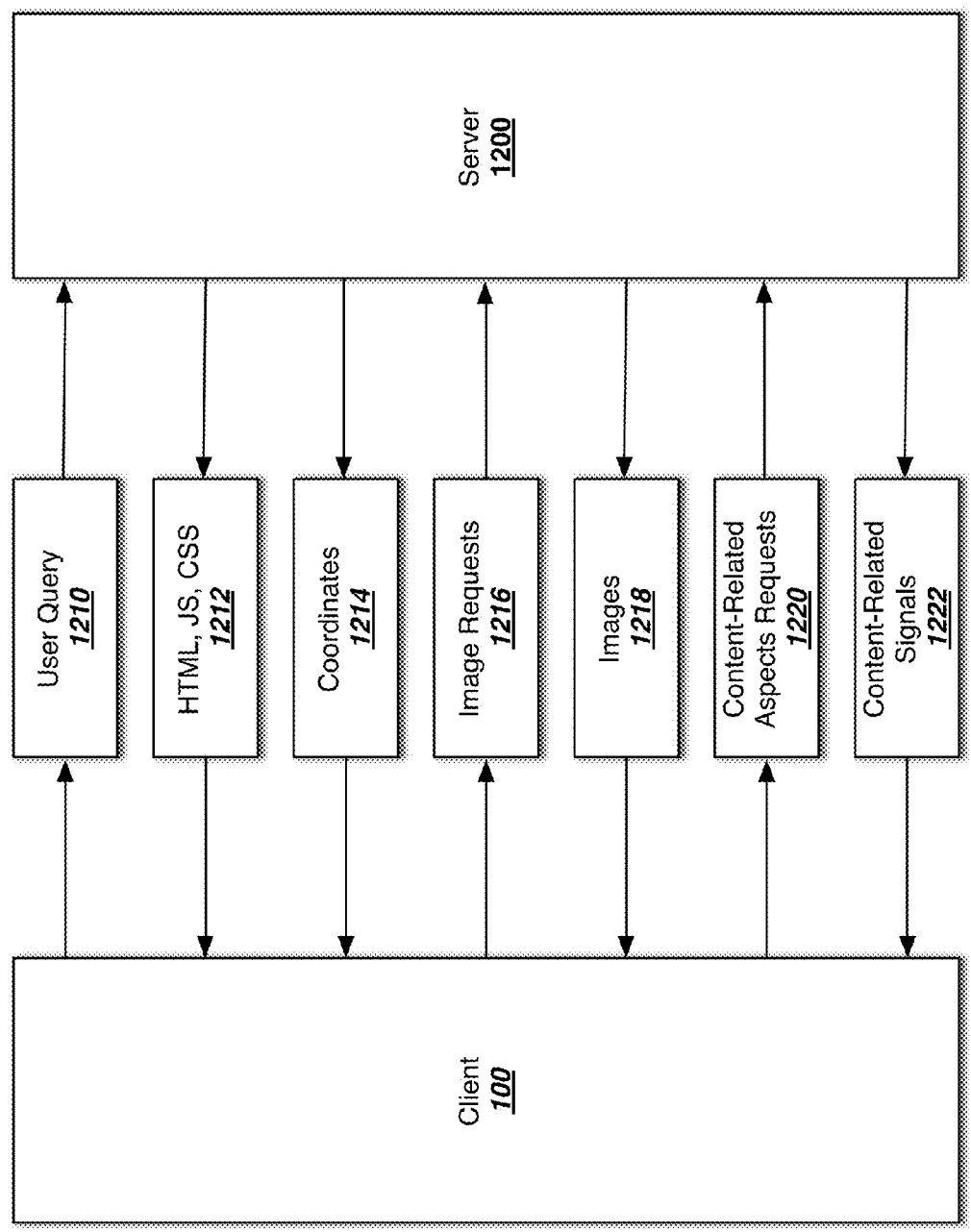
FIG. 12 is an illustration of a schematic diagram of example interactions between example client and server computing platforms, according to an embodiment.

FIG. 12 is an illustration of a schematic diagram of example interactions between example client 100 and server 1200 computing platforms, according to an embodiment. Hardware, software, and/or firmware technology described herein may be utilized to implement one or more example systems, including for example, those described herein, for example as described above in connection with FIGS. 1-11. In an embodiment, one or more servers 1200 may communicate with a client 100 to provide signals in response to user navigation and/or interaction(s). In an embodiment, a client 100 may comprise generally a browser-type and/or mobile-application-type client. For example, iOS, Android, and/or Windows 8 technologies may be utilized, at least in part. However, claimed subject matter is not limited in scope to these illustrative examples, and other embodiments are also possible, of course. Also, in an embodiment, all aspects of a system as described herein, for example, may be implemented in an application on a single physical device and/or embedded system, although again, claimed subject matter is not limited in scope in this respect. For example, multiple physical devices or systems may be employed.

As illustrated in FIG. 12, client 100 may provide requests to server 1200 based at least in part on user queries, such as user query 1210, and/or interactions, and server 1200 may respond with appropriate signals. For example, a session may begin with a user query 1210, and server 1200 may respond with front-end assets 1212 including, for example, HTML, JS, and/or CSS components, that may be employed for presentation and/or interaction of client 100, in an embodiment. Server 1200 may also respond with coordinates 1214 of collection items to characterize or partially characterize a spatial arrangement, such as semantic map 112, in client 100. Additionally, client 100 may request images 1216 of different sizes & resolutions, for example, over time, and server 1200 may respond with specified images 1218, in an embodiment. Client 100 may also request other content-related aspects 1220 for specified items, for example, that client 100 may display in a details pane, such as details pane 700 depicted in FIG. 7. In an embodiment, server 1200 may respond with content-related signals 1222 at least in part to client request 1220.

In an embodiment, it may be desirable to display relatively larger, higher-resolution images for items that a user may be interested in. However, sending and receiving higher-resolution images for relatively large numbers of items may result in undesirable delays as perceived by a user, as well as in excessive computation and/or processing expenses for a server, such as server 1200. To substantially reduce "expenses," in an embodiment, a client, such as client 100, may dynamically request images, for example through image requests 1216, of different resolutions as appropriate and/or desired. For example, lower resolutions may be initially requested, and progressively enhanced resolutions may be requested over time and/or as a user zooms "in," in an embodiment. Progressive refinement may be coupled with user interaction, in an embodiment. For example, at least in part in response to a user zooming out, a client, such as client 100, may download and display lower resolution items for items that may be additional. As a user zooms in, fewer items may be visible in a visible area, such as area 102, which may allow client 100 to request download of larger and/or higher-resolution images for those visible items, such as, for example, items 202. Additionally, in response to a user-initiated pan, additional images may become visible and client 100 may request download of those images.

Also, at least in part in response to a user zooming back out, client 100 may determine whether client 100 has lower resolution images stored locally, in an embodiment. If lower-resolution images are not stored locally, client 100 may re-request download. In an embodiment, relative to downloading higher-resolution images for a relatively large number of items, example progressive enhancement techniques, such as, for example, described herein may reduce overall signal transmission, at least in part because a user may not necessarily explore all aspects of a map at higher resolutions and/or zoomed in. Further, a system utilizing example progressive enhancement techniques, such as those described herein, may display a lower-resolution image to a user while waiting for a higher-resolution image to be downloaded so that a user is not left to wait before being able to interact with an image.

Communicating over a network, such as, for example, using HTTP requests, may incur an overhead associated with sending and/or receiving individual messages. For example, individual messages may have HTTP headers which may be a larger fraction of a transmission for smaller messages. Additionally, latency may be incurred for individual requests, as a message may be physically transmitted between client 100 and server 1200 and back, for example, and may be electronically processed at both ends and along the way. For these reasons, it may be desirable to "batch" requests and/or responses, for example, to request and/or receive signals for numerous items at once. For example, server 1200 may respond to a request with a JSON packet-type structure including a list of data-fields, such as, for example, prices and identifiers for individual items. An example structure may comprise, for example: {"price": [{"id7": "$59"}, {"id3": "$79"}, {"id2": "$25"},]}. An example packet structure may comprise a wide range of signals, including images, for example, wherein, in an embodiment, individual packet-type fields may comprise a base64-encoded string of the image.

In an embodiment, a batch-size may comprise a number of items sent in individual communications. In an embodiment, an example batch size may comprise a batch size of three, such as seen in the case above for id7, id3, and id2, for example. Another advantage of batching is that online compression processes may achieve improved compression for longer files, for example, by amortizing a compression codebook over a larger payload, in an embodiment. Also, in an embodiment, a number of readily available requests to be made and/or readily available responses to be sent may outnumber a specified batch-size. A client 100 and/or server 1200 may include an attribute to split requests into relatively smaller batch-size chunks. On the other hand, if a number of readily available requests and/or responses may be smaller than a specified batch-size, client 100 and/or server 1200 may wait to accumulate more requests and/or responses until reaching a batch-size or reaching a time-out, in an embodiment.

Selecting a batch-size may comprise a trade-off between overall efficiency and responsiveness. For example, the larger the batch-size, the more likely it is that the some items are delayed while waiting to accumulate more requests and/or responses. For another example, on one extreme, if batch-size were specified to be a batch-size of one, requests and/or responses may be sent relatively quickly. However, there may be little to no improvement on the aforementioned inefficiencies. On another extreme, if batch-size were equal to total number of results, there may be advantages gained for communication and/or processing, for example, but a user may see and/or otherwise experience the first and/or fastest results no earlier than the last and/or slowest results.

Figure 13:
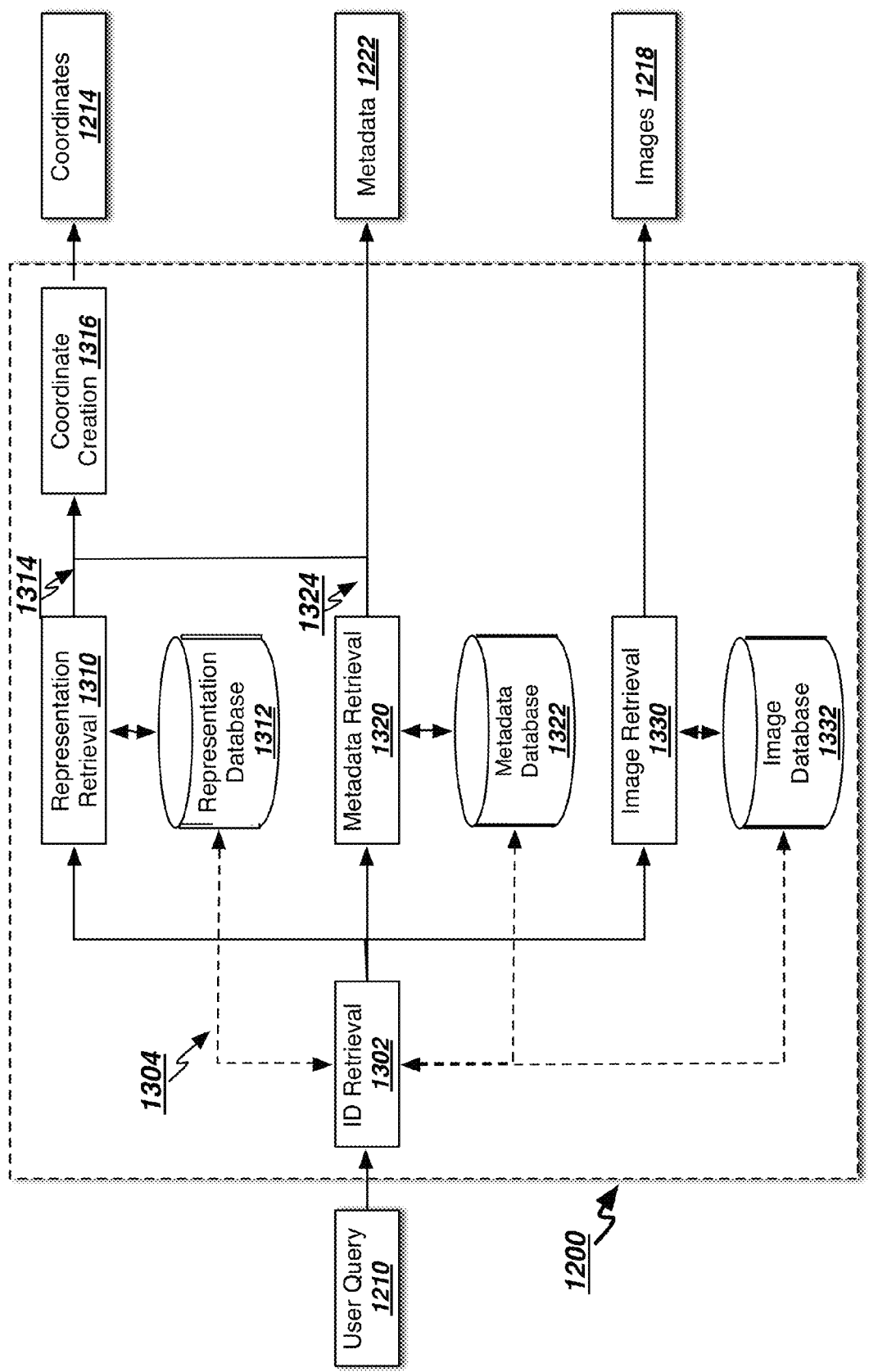
FIG. 13 is a schematic diagram illustrating example functions performed by an example server computing device, according to an embodiment.

FIG. 13 is a schematic diagram illustrating example functions performed by an example server computing device, according to an embodiment. FIG. 13 depicts an example embodiment 1200 of a server. At least in part in response to receiving a user query 1210, an ID Retrieval module 1302 may retrieve a set of item identifiers corresponding to that query. ID retrieval module 1302 may reference a database storing memory states, such as metadata database 1322, and/or ID retrieval module may have previously generated a search index on database 1322. ID retrieval module 1302 may also reference a representation database, such as representation database 1312, and/or an image database, such as image database 1332, for example, to perform query-by-example, or content-type image retrieval. Query by example is discussed below.

In an embodiment, ID retrieval module 1302 may send a set of identifiers 1304, and possibly additional signals including processing and/or filtering signals, to a representation retrieval module 1310, an image retrieval module 1330, and a metadata signal retrieval module 1320, for example. The aforementioned modules, for example, may begin to retrieve signals and/or stored states for user responses, as well as retrieving signals and/or stored states that a user may request later to be more responsive, in an embodiment. For example, a client may request a subset of signals and/or stored states initially, and for at least a subset of items, metadata state retrieval module 1320 may retrieve additional signals and/or states that may eventually be displayed in a details pane, such as details pane 700 of FIG. 7.

Also, in an embodiment, representation retrieval module 1310 may retrieve signals and/or states from representation database 1312, image retrieval module 1330 may retrieve signals and/or data from database 1332, and metadata state retrieval module 1320 may retrieve signals and/or states from database 1322. In an embodiment, at least in response to retrieving appropriate fields for the requested identifiers, image retrieval module 1330 and/or metadata state retrieval module 1320 may perform batching operations, for example as described above, and may format a response, for example into JSON. Representations 1314 may be transmitted to a coordinate creation module 1316 that may transform representations and/or states for an item collection into coordinates 1214, in an embodiment.

As used herein, the term "representations" may related to signals and/or states related to a digital content item. An example representation scheme may have values for items with similar representations, for example. Thus, values that may be relatively close may tend to be semantically similar, for example, as judged by human observers. Similarly, items having signals and/or state-related values with dissimilar representations may tend to be judged as semantically dissimilar.

In an embodiment, an example format for a representation may comprise a vector of signals and/or state-related values. In an embodiment, an example of a distance between items having specified values may comprise an L2-distance, for example a square-root of the sum of the squared differences between individual values representing dimensions of a vector. In an embodiment, representations may comprise fixed-length vectors and/or variable length vectors. For example, in an embodiment, representations may comprise so-called bag-of-features, such as, for example bag-of-words for text. Also, in another embodiment, measures of relatively close similarity may be based at least in part on metrics other than distance. For example, representations may comprise similarity metrics such as, for example, cosine similarity, non-metric similarity measures such as, for example, Kullback-Liebler divergence, empirical observed similarities such as, for example, co-clicks, and/or parametric and/or nonparametric functional mappings such as, for example, neural networks and/or Gaussian Processes, respectively. Of course, claimed subject matter is not limited in scope in these respects.

In an embodiment, higher-level statistical approaches may create useful representations in situations in which raw signals and/or states may not. For example, two chessboards with opposite colors positioned in the bottom left-corner may be dissimilar by at least some distance metrics, while human observers would typically consider those chessboards to be semantically similar. Therefore, it may be desirable to utilize feature extraction and/or machine learning to extract potentially meaningful representations. For example, in an embodiment, an example mapping system may utilize a Deep Network (DN), such as, for example, a Deep Belief Network, on raw signals and/or states, and utilize a state of one or multiple levels of the DN as a representation of individual items.

Figure 14:
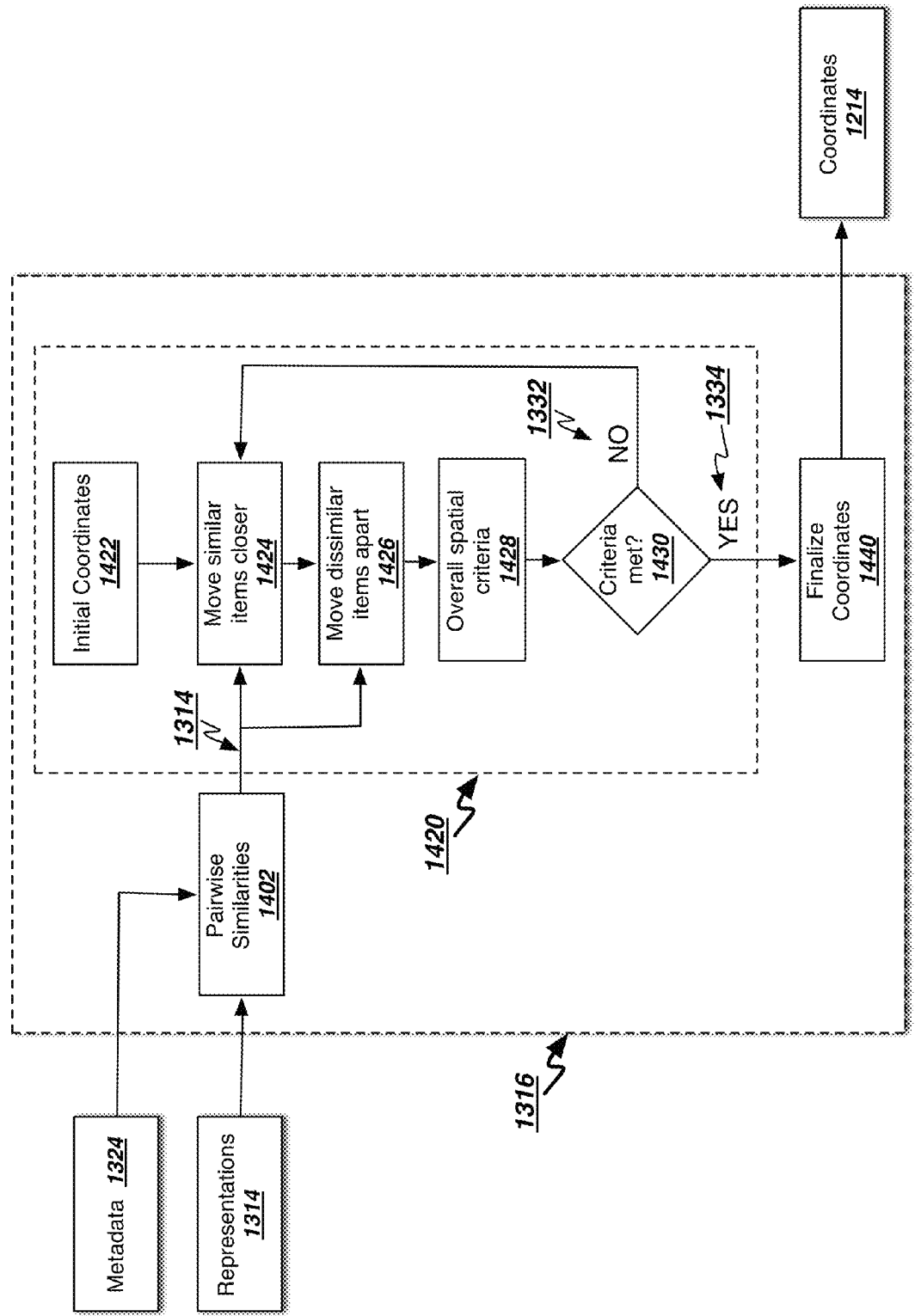
FIG. 14 is a schematic diagram illustrating an example coordinate creation function performed by an example server computing device, according to an embodiment.

FIG. 14 is a schematic diagram illustrating an example coordinate creation operation performed by an example server computing device, according to an embodiment. In an embodiment, given a set of representations and signal and/or state values associated with a given query and/or digital content item collection, a task of coordinate creation module 1316 may be to generate a spatial arrangement of items 112 fitting desired goals, such as, for example, making similar items more likely to be displayed nearby in a spatial arrangement. In an embodiment, a task of coordinate creation module may comprise finding a spatial arrangement of items wherein spatial distances at least approximately correspond with similarity of items' representations. In an embodiment, representation vectors and L2 distances may be utilized, and a 2D spatial arrangement may be generated. In an embodiment, coordinate creation module 1316 may seek to find an (x,y) position for individual items such that items with relatively smaller L2-distances between their representations will have small L2-distances between their (x,y) positions. In an embodiment, a distance in "representation space" need not precisely match a distance in the "coordinate space," although L2-distance is described herein for both for simplicity or convenience of explanation.

Referring to FIG. 14, in an embodiment, given representations 1314 and metadata signal or state value 1324 for a set of items, a pairwise similarities module 1402 may calculate similarities and/or distances for some or all of pairwise combinations of set elements 1314 that may be utilized by a coordinate calculation module 1420, for example. As an example, a relatively simple iterative implementation will described as follows. Of course, claimed subject matter is not limited in scope to these illustrative examples. In an embodiment, an initial set of coordinates 1422 may be selected. In an embodiment, coordinates may be randomly distributed, or in another embodiment coordinates may comprise a result of a preprocessing calculation to accelerate iterations. For example, at least partial coordinates may result from previous calculations of coordinate calculation module 1420, in an embodiment. In an example embodiment, beginning with initial coordinates 1422, coordinate calculation module 1420 may perform a loop of operations.

For example, items with relatively larger pairwise similarities and/or smaller pairwise distances 1314 may be moved closer together, as depicted at 1424 of FIG. 14. As used herein, "moving closer together" may relate to adjusting item coordinates such that a spatial distance between items is smaller. In an embodiment, this may be accomplished at least in part by calculating a vector between two items and by moving an item by a relatively smaller amount along a vector pointing towards another item. Also, in an embodiment, items having smaller pairwise similarities and/or larger pairwise distances 1314 may be moved farther apart, as depicted at 1426 of FIG. 14. As used herein, "moving farther" apart may relate to adjusting item coordinates such that a spatial distance between them is larger. This may be accomplished at least in part by calculating a vector between two items and moving an item by a smaller amount along the vector pointing away from another item.

Additionally, in an embodiment, item coordinates may be adjusted to satisfy other spatial arrangement goals, such as depicted at 1428 of FIG. 14. For example, as discussed previously, it may be desirable to have elements lie on a grid, for example, at discrete locations similar to squares of a chess board, in an embodiment. Module 1428 may, in an embodiment, move items slightly towards grid locations. Module 1428 may also separate items that are closer to each other, so that individual items may be visible if displayed in client 100. Additionally, module 1428 may inject one or more global biases in locations of items with specified properties. For example, module 1428 may cause "red" items to move up and/or north in a space, wherein red may be determined by some property of a representation or of metadata signal and/or state value.

At least in part in response to making coordinate adjustments, a determination may be made as to whether an overall set of coordinates satisfies or at least approximately satisfies a stopping criteria, as depicted at 1430 of FIG. 14. In an embodiment, a determination may be made based at least in part on a score related to a matching between coordinate distances and/or representation distances. In another embodiment, a determination may be based at least in part on a specified number of iterations that calculation module 1420 is able to perform. At least in part in response to a determination that stopping criteria may not be met, as depicted at 1332 of FIG. 14, another iteration may be performed, starting at 1424. Further, at least in part in response to a determination that stopping criteria may be met, as depicted at 1334 of FIG. 14, loop 1420 may be exited and final coordinates may be sent to be finalized at module 1440. In an embodiment, finalizing coordinates may comprise formatting into JSON format, for example, and/or packaging with other signals or state aspects or features regarding the coordinates, such as, for example, a range of coordinates and/or selective and/or meaningful distances between items. In an embodiment, result 1214 may be sent to client computing platform 100.

In an embodiment, different coordinate adjustments depicted at modules 1424, 1426, and 1428 may move items in conflicting directions during any particular iteration of loop 1420, so relatively small step sizes may be taken, for example. Adjustments may be made for individual pairwise interactions considered, or accumulated for multiple pairwise interactions before being employed, in an embodiment. Also, in an embodiment, different weightings may be employed with actions taken at module 1424 and at module 1426. For example, a user may at times be more concerned with similar items being close, as long as dissimilar items do not interfere with proximity of similar items, and may be less concerned with relative distances for already far-apart items. Therefore, in an embodiment, it may be advantageous to put more weight on 1424 than 1426, for example, to take larger step sizes in 1424 than in 1426.

Also, in an embodiment, modules 1424, 1426 and/or 1428 may operate concurrently and may also, at least in part, share computational operations. For example, computational operations may take multiple goals of modules 1424, 1426, and/or 1428 into account concurrently. Additionally, similarities need not be pairwise, in an embodiment. However, similarities between two sets of items may be considered, as a factor. This might be useful, for example, in situations where there are a set of closely related items, such as, for example, different colors of the same dress, or different recordings of the same song. Additionally, techniques performed at 1316 and 1420 may be modified using linear dimensionality reduction, such as, for example, Principal Components Analysis, and/or non-linear dimensionality reduction methods, such as, for example, Isomap, Locally-Linear Embedding, Kernel Principal Components Analysis, Stochastic Neighborhood Embedding, and/or Laplacian Eigenmaps, to name a few non-limiting examples.

System and/or techniques, including, for example, those described herein, may be well-suited to query-by-example, such as commencing a process with an example of an item a user is interested in. For example, at FIG. 13, query 1210 may comprise an example item a user may be interested in, such as, for example, an image. ID retrieval module 1302 may process the example and module 1304 may retrieve from representation database 1312 items having potentially similar representations, for example. Retrieval of similar representations may be done via comparison of database representations to query representations, in an embodiment. In an embodiment, comparisons may be accelerated through techniques such as, for example, Latent Semantic Analysis, Semantic Hashing, and/or Spectral Hashing.

Figure 15:
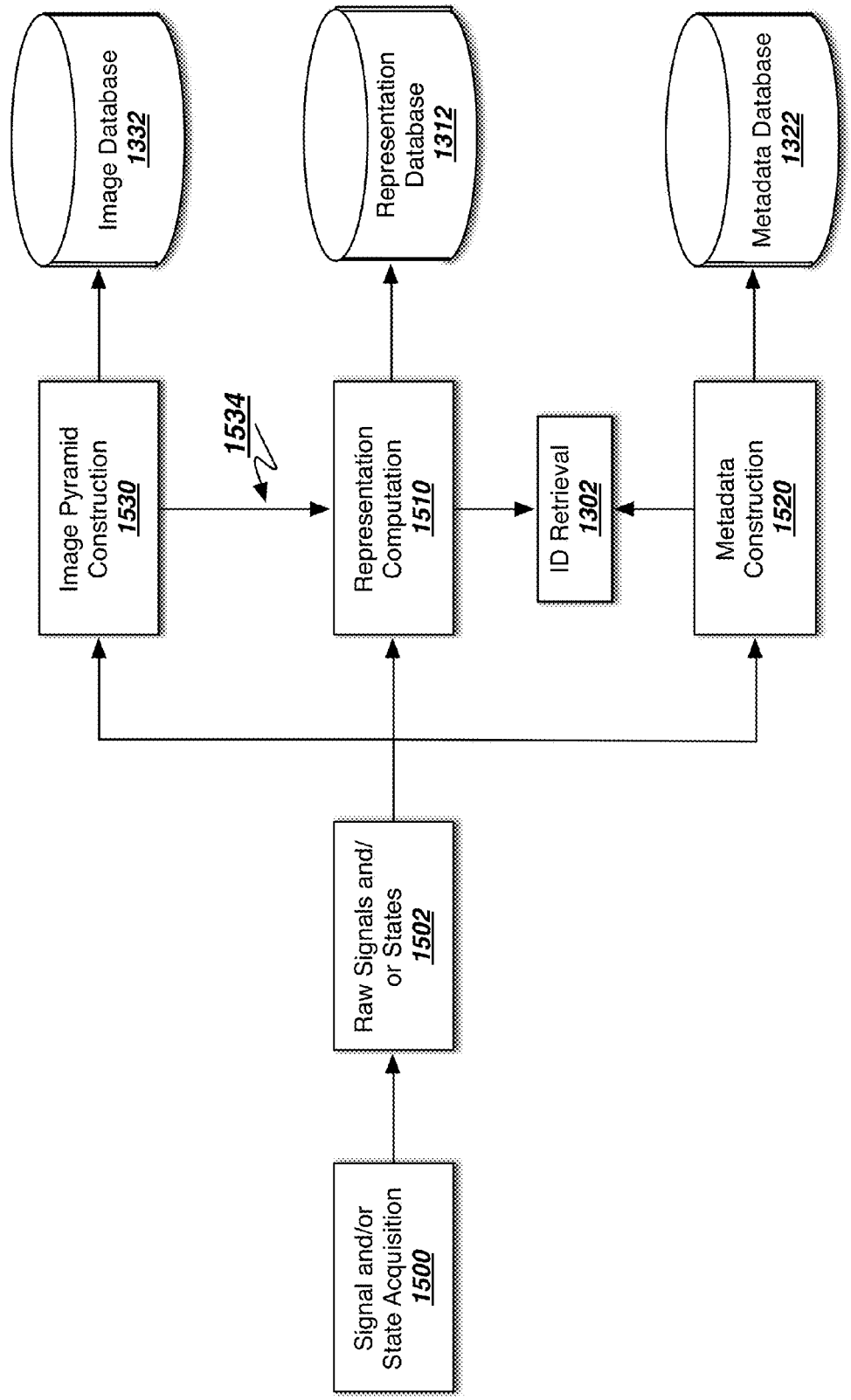
FIG. 15 is a schematic diagram illustrating an example data preparation function performed by an example server computing device, according to an embodiment.

FIG. 15 is a schematic diagram illustrating an example signal computation operation performed by an example server computing device, according to an embodiment. To enable server 1200 to perform processing depicted in FIG. 13, for example, rapidly and/or effectively, signals and/or states may be initially prepared as depicted in FIG. 15. In an embodiment, raw signals and/or states may be acquired as depicted at module 1500, for example. Signals and/or states may be acquired in different ways including, for example, crawling of websites with spiders, data streams and/or subscriptions, and/or user generated and/or submitted. For example, a user may upload images, video, and/or audio, for example, directly to a site. Also, in an embodiment, data acquisition module 1500 may perform cleanup and normalization of the data, such as, for example, converting different formats to a standardized format. Data acquisition module 1500 may generate output signals 1502 that may be passed to three modules, in an embodiment. For example, signals and/or states may be sent to metadata state extraction module 1520, which may extract useful metadata state values to be used in portions of a system, such as, for example, in details pane 700 depicted in FIG. 7. Metadata state extraction module 1520 may also, in an embodiment, store state to database 1322. In an example using clothing values, metadata extracted states may relate to, for example, prices, sizes, and/or reviews.

Also in an embodiment, image pyramid construction module 1530 may extract target images, whether images themselves and/or references to them, from metadata state values, and may resize those images to one or more different sizes. Images may also be stored in image database 1332. For example, if an original target image is of size 512×512, that is, 512 pixels wide and 512 pixels tall, image pyramid construction module 1530 may rescale target image to some or all of the following sizes: 256×256, 128×128, 64×64, 32×32, 16×16, 8×8, 4×4, 2×2, and 1×1, for example, and store these into image database 1332. This may allow database 1332 to respond relatively quickly with different sizes images as requested by a client 100, in an embodiment. Alternatively, images may be stored at a largest specified size, and resized dynamically as client 100 requests different sizes. This offers a tradeoff between storage size and processing capability, for example.

Representation computation module 1510 may operate on images 1534 and raw signals or states 1502 to create representations, for example as described above. For example, module 1510 may extract higher-level statistical structure from image, textual, video, and/or audio signals or states, for example, using feature extraction and/or machine learning methods, in an embodiment. For example, module 1510 may compute color histograms for individual images and may store a vector representing those histograms as a representation for individual items. Also, in an embodiment, module 1510 may apply a Restricted Boltzmann Machine to individual images and may utilize an inferred state of a hidden layer as another representation for individual items.

As described above, an example system may utilize multiple, different representations. For example, a system may combine different representations to improve a given arrangement, and/or a system may offer different arrangements to users, for example for different reasons and/or different use cases.

In an embodiment, metadata extraction module 1520 and/or representation computation module 1510 may direct their signal outputs to ID retrieval module 1302. Module 1302 may perform preprocessing to enable accelerated retrieval, for example by building a search index on text tokens and/or preparing packet-type structures for query-by-example, in an embodiment.

In an embodiment, servers, such as server computing platform 1200, may use Graphic Programming Units (GPUs) to take advantage of parallel processing capabilities, for example. GPUs may accelerate computation of representations and/or computation coordinates, in an embodiment. Coordinate computation module 1420, for example, may involve comparing many items' representations to many other items' representations. Coordinate computation may comprise a higher-parallelizable computation and may be well-suited for GPUs. Of course, claimed subject matter is not limited in scope in these respects.

In an embodiment, representation database 1312, image database 1332, and/or metadata database 1322 may comprise separate processes, for example, or may comprise a single database. Additionally, in an embodiment, separate processes may be executed on different machines and/or may utilize different physical storage, which may improve retrieval times, for example, especially on spinning hard drives. Example databases may comprise some combination of SQL databases and/or non-SQL databases, such as HBase, Mongodb, and/or Cassandra, in an embodiment. For server-less implementations, signal values may be stored in memory or on a local disk in an appropriate format. Of course, claimed subject matter is not limited in scope in these respects.

Some example application domains that may benefit from techniques, such as those described herein, may include, by way of non-limiting example: video; music; photography; stock photography; art; furniture & home goods; retail soft goods, such as clothing & accessories; retail hard goods, such as electronics, appliances, and sporting goods; web pages; people, such as, for example, online user profiles, user behaviors, facial appearance; entities, such as companies or sports teams; legal rulings and precedents; scientific publications; news stories; online messages, such as tweets; sound effects; medical images; 3D models, such as cad designs; color palettes; real estate; recipes; chemical compounds, such as for drug discovery; and books. Again, claimed subject matter is not limited in scope in these respects.

Some example usage environments that may benefit from techniques, such as those described herein, include, but are not limited to: desktop web browser; desktop application, such as Windows, Mac OS X, and/or Linux; mobile web browser; mobile application, such as iOS, Android, Windows, and/or Blackberry OS; television devices, such as set top boxes and DVD players; touch tables; and spatial gesture devices, such as augmented reality heads-up displays. Of course, claimed subject matter is not limited in scope in these respects.

Figure 16:
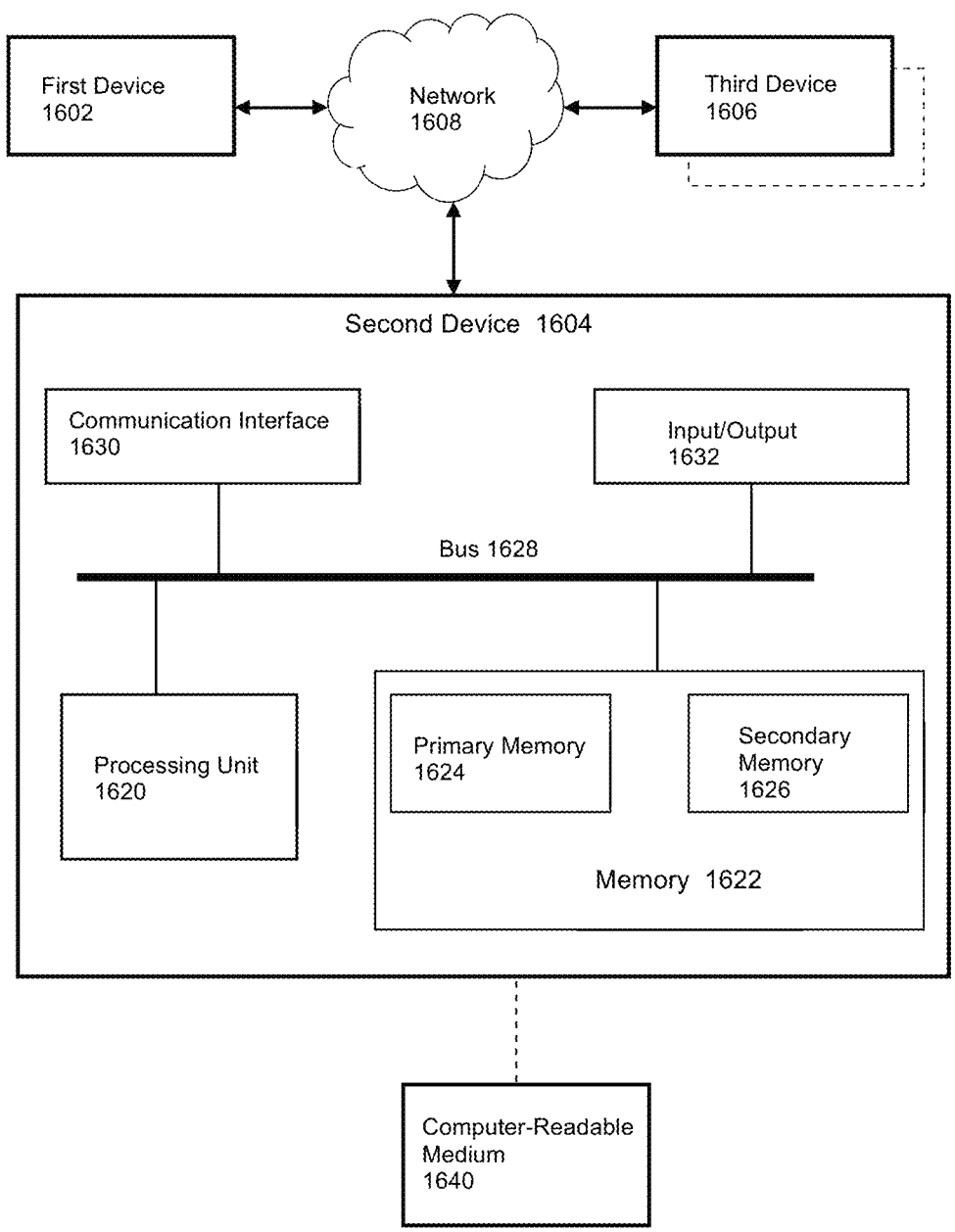
FIG. 16 is a schematic diagram illustrating an example computing device in accordance with an embodiment.

FIG. 16 is a block diagram illustrating an example system comprising a plurality of computing devices coupled via a network in accordance with an embodiment. For purposes of illustration, FIG. 16 is an illustration of an embodiment of a computing platform or computing device 1604 that may be employed in a client-server type interaction, such as described infra. In FIG. 16, computing device 1604, which may comprise features of a server computing device, may interface with a computing device 1602, which may comprise features of a client device, for example. In other embodiments, computing device 1604 may comprise a client computing device, and computing device 1602 may comprise a server computing device, for example. In an embodiment, communications interface 1630, processor (e.g., processing unit) 1620, and memory 1622, which may comprise primary memory 1624 and secondary memory 1626, may communicate by way of communication bus 1628, for example. In FIG. 16, computing device 1604 may store various forms of content, such as analog, uncompressed digital, lossless compressed digital, or lossy compressed digital formats for content of various types, such as video, imaging, text, audio, etc. in the form physical states or signals, for example. Computing device 1604 may communicate with computing device 1602 and/or with computing device 1606 by way of an Internet connection via network 1608, for example. Although the computing device 1604 of FIG. 16 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter to limited in scope to illustrative examples.

Processor 1620 may be representative of one or more circuits, such as digital circuits, to perform at least a portion of a computing procedure or process. By way of example but not limitation, processor 1620 may comprise one or more processors, such as controllers, microprocessors, microcontrollers, application specific integrated circuits, digital signal processors, programmable logic devices, field programmable gate arrays, and the like, or any combination thereof. In implementations, processor 1620 may perform signal processing to manipulate signals or states or to construct signals or states, for example.

Memory 1622 may be representative of any storage mechanism. Memory 1622 may comprise, for example, primary memory 1624 and secondary memory 1626, additional memory circuits, mechanisms, or combinations thereof may be used. Memory 1622 may comprise, for example, random access memory, read only memory, or one or more data storage devices or systems, such as, for example, a disk drive, an optical disc drive, a tape drive, a solid-state memory drive, just to name a few examples. Memory 1622 may be utilized to store a program, as an example. Memory 1622 may also comprise a memory controller for accessing computer readable-medium 1640 that may carry and/or make accessible content, code, and/or instructions, for example, executable by processor 1620 or some other controller or processor capable of executing instructions, for example. Also, in an embodiment, memory 1622 may store a local database cache, for example.

Under the direction of processor 1620, memory, such as cells storing physical states, representing for example, a program, may be executed by processor 1620 and generated signals may be transmitted via the Internet, for example. Processor 1620 may also receive digitally-encoded signals from server 1604.

Network 1608 may comprise one or more communication links, processes, and/or resources to support exchanging communication signals between a client and server, which may, for example, comprise one or more servers (not shown). By way of example, but not limitation, network 1608 may comprise wireless and/or wired communication links, telephone or telecommunications systems, Wi-Fi networks, Wi-MAX networks, the Internet, the web, a local area network (LAN), a wide area network (WAN), or any combination thereof.

The term "computing device," as used herein, refers to a system and/or a device, such as a computer, that includes a capability to process and/or store data in the form of signals and/or states. Thus, a computing device, in this context, may comprise hardware, software, firmware, or any combination thereof (other than software per se). Computing device 1604, as depicted in FIG. 16, is merely one such example, and the scope of claimed subject matter is not limited to this particular example. For one or more embodiments, a computing device may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing device.

Memory 1622 may store cookies relating to one or more users and may also comprise a computer-readable medium that may carry and/or make accessible content, code and/or instructions, for example, executable by processor 1620 or some other controller or processor capable of executing instructions, for example. A user may make use of an input device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR)

mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or combination thereof.

A computing device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include or may execute a variety of now known, or to be developed operating systems, or derivatives and/or versions, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A computing device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A network may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms and/or symbolic representations of operations on binary signals or states, such as stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

The invention claimed is:

1. A method, comprising:
displaying a collection of digital content items on a display of a computing device, wherein a two-or-more-dimensional spatial arrangement of individual digital content items of the displayed collection comprises individual digital content items being positioned relative to other individual digital content items based, at least in part, on analytic characterizations of one or more semantically-meaningful attributes of the individual digital content items of the collection of digital content items, wherein the analytic characterizations of the one or more semantically-meaningful attributes of the individual digital content items comprise determining a degree of similarity among individual digital content items of the collection of digital content items based at least in part on one or more semantically-meaningful attributes of the individual digital content items; and
at least in part in response to obtaining a user interaction by way of an input device of the computing device, dynamically rearranging the relative positions of the individual digital content items of the displayed collection of digital content items based at least in part on one or more weighted factors specified at least in part via the user interaction without explicit identification by the user of the one or more weighted factors, wherein the dynamically rearranging the relative positions of the individual digital content items of the displayed collection of digital content items further includes adjusting the spatial arrangement at least in part in response to a user selection of a filter criteria.

2. The method of claim 1, wherein the one or more semantically-meaningful attributes comprises one or more image-based attributes.

3. The method of claim 2, wherein the one or more image-based attributes comprise one or more attributes based on color.

4. The method of claim 2, wherein the one or more image-based attributes comprise one or more attributes based on shape.

5. The method of claim 1, wherein the one or more semantically-meaningful attributes comprise one or more text-based attributes.

6. The method of claim 5, wherein the one or more text-based attributes comprise one or more attributes based on tags and/or other metadata.

7. The method of claim 1, wherein the one or more semantically-meaningful attributes comprise one or more audio-based attributes.

8. The method of claim 1, wherein the one or more semantically-meaningful attributes comprise one or more collaborative and/or social attributes.

9. The method of claim 1, wherein said dynamically rearranging the relative positions of the individual digital content items of the displayed collection of digital content items at least in part in response to receiving a user interaction comprises dynamically adjusting the spatial arrangement at least in part in response to a user query.

10. A method, comprising:
  displaying a collection of digital content items on a display of a computing device, wherein a two-or-more-dimensional spatial arrangement of individual digital content items of the displayed collection comprises individual digital content items being positioned relative to other individual digital content items based, at least in part, on analytic characterizations of one or more semantically-meaningful attributes of the individual digital content items of the collection of digital content items, wherein the analytic characterizations of the one or more semantically-meaningful attributes of the individual digital content items comprise determining a degree of similarity among individual digital content items of the collection of digital content items based at least in part on one or more semantically-meaningful attributes of the individual digital content items;
  dynamically adjusting the visual display of the spatial arrangement of the individual digital content items of the displayed collection of digital content items at least in part in response to obtaining a user interaction by way of an input of the computing device, including performing a filter operation and a pan operation, based at least in part on one or more weighted factors specified at least in part via the user interaction without explicit identification by the user of the one or more weighted factors; and
  dynamically adjusting the spatial arrangement of the individual digital content items of the displayed collection of digital content items at least in part by performing a zoom operation in response to obtaining an additional user interaction.

11. The method of claim 10, wherein the user interaction comprises a user selection of a pan button displayed on the display of the computing device.

12. The method of claim 10, wherein the user interaction comprises a user input click-and-drag activation indicative of the pan operation.

13. The method of claim 10, wherein the obtaining the additional user interaction comprises obtaining a user selection of a zoom button displayed on the display of the computing device.

14. The method of claim 10, wherein the obtaining the additional user interaction comprises obtaining a mouse wheel activation indicative of the zoom operation.

15. An apparatus, comprising:
  a processor to initiate display of a collection of digital content items on a display of a computing platform, wherein a two-or-more-dimensional spatial arrangement of individual digital content items of the collection to be displayed to comprise individual digital content items to be positioned relative to other individual digital content items based, at least in part, on analytic characterizations of one or more semantically-meaningful attributes of the individual digital content items of the collection of digital content items, wherein the processor, at least in part to perform the analytic characterization of the one or more semantically-meaningful attributes of the individual digital content items, to determine a degree of similarity among individual digital content items of the collection of digital content items to be based at least in part on one or more semantically-meaningful attributes of the individual digital content items, the processor further to, at least in part in response to a interaction by way of an input device of the computing device, dynamically rearrange the spatial arrangement of the individual digital content items of the collection of digital content items to be displayed based at least in part on one or more factors to be weighted to be specified at least in part via the user interaction without explicit identification by the user of the one or more factors to be weighted, wherein the processor to dynamically rearrange the spatial arrangement of the individual digital content items of the collection of digital content items to be displayed at least in part in response to a user selection of a filter criteria.

* * * * *